United States Patent
Tsunekawa et al.

(10) Patent No.: US 8,897,799 B2
(45) Date of Patent: Nov. 25, 2014

(54) WIRELESS COMMUNICATION SYSTEM, WIRELESS COMMUNICATION APPARATUS, AND WIRELESS COMMUNICATION METHOD

(75) Inventors: Koichi Tsunekawa, Osaka (JP);
Toshiaki Kameno, Osaka (JP);
Katsutoshi Ishikura, Osaka (JP);
Yoshio Konno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 263 days.

(21) Appl. No.: 13/391,781

(22) PCT Filed: Aug. 10, 2010

(86) PCT No.: PCT/JP2010/063577
§ 371 (c)(1),
(2), (4) Date: Feb. 22, 2012

(87) PCT Pub. No.: WO2011/024646
PCT Pub. Date: Mar. 3, 2011

(65) Prior Publication Data
US 2012/0157143 A1     Jun. 21, 2012

(30) Foreign Application Priority Data

Aug. 25, 2009   (JP) ................................. 2009-194610

(51) Int. Cl.
*H04W 72/00* (2009.01)
*H04L 5/00* (2006.01)
*H04W 72/06* (2009.01)
*H04W 72/04* (2009.01)

(52) U.S. Cl.
CPC ............. *H04W 72/06* (2013.01); *H04L 5/0058* (2013.01); *H04W 72/0453* (2013.01)

USPC .......................................... 455/452.2; 455/450

(58) Field of Classification Search
None
See application file for complete search history.

(56) References Cited

U.S. PATENT DOCUMENTS

| | | | | |
|---|---|---|---|---|
| 7,430,420 | B2 * | 9/2008 | Derakhshan et al. ....... | 455/452.2 |
| 7,444,127 | B2 * | 10/2008 | Laroia et al. ................... | 455/140 |
| 2005/0286547 | A1 * | 12/2005 | Baum et al. .................... | 370/437 |

(Continued)

FOREIGN PATENT DOCUMENTS

| | | |
|---|---|---|
| CN | 1926907 A | 3/2007 |
| CN | 1998146 A | 7/2007 |

(Continued)

OTHER PUBLICATIONS

3GPP TR 36.814 V0.4.1, Chapter 5 (Feb. 2009), 3rd Generation Partnership Project; Technical Specification Group Radio Access Network; Further Advancements for E-UTRA Physical Layer Aspects, (Release 9), pp. 1-31.

(Continued)

*Primary Examiner* — Lewis West
(74) *Attorney, Agent, or Firm* — Birch, Stewart, Kolasch & Birch, LLP

(57) ABSTRACT

A wireless communication apparatus includes: a receiving unit that receives a signal indicating a frequency band having the highest priority of selection among a plurality of frequency bands; and a transmitting unit that transmits data in parallel, using the frequency band having the highest priority of selection and a frequency band having a priority of selection lower than that of the frequency band having the highest priority of selection.

20 Claims, 19 Drawing Sheets

(56) References Cited

U.S. PATENT DOCUMENTS

| | | | |
|---|---|---|---|
| 2006/0084404 A1* | 4/2006 | Laroia et al. | 455/266 |
| 2007/0202904 A1 | 8/2007 | Cheng et al. | |
| 2008/0298450 A1 | 12/2008 | Zhang et al. | |
| 2011/0003551 A1 | 1/2011 | Kameno et al. | |

FOREIGN PATENT DOCUMENTS

| | | | | |
|---|---|---|---|---|
| CN | 1998220 A | 7/2007 | | |
| CN | 101401480 A | 4/2009 | | |
| WO | 2005/109657 A1 | 11/2005 | | |
| WO | 2005/109832 A1 | 11/2005 | | |
| WO | WO2007015962 | * | 2/2007 | H04W 72/08 |
| WO | WO 2009/096319 A1 | 8/2009 | | |

OTHER PUBLICATIONS

3GPP TSG RAN WG1 Meeting #55, "Spectrum Aggregation Operations—UE Impact Considerations", Motorola, R1-084405, Nov. 10-14, 2008, pp. 1-5.

3GPP TSG RAN WG1 #55, "Issues on Carrier Aggregation for Advanced E-UTRA", Texas Instruments, R1-084443, Nov. 10-14, 2008, pp. 1-5.

3GPP TSG-RAN WG1 Meeting #56 "PDCCH coding and mapping for carrier aggregation", Panasonic, R1-090682, Feb. 9-13, 2009, pp. 1-5.

* cited by examiner

FIG. 3

| COMPONENT CARRIER IDENTIFIER | FREQUENCY BAND INFORMATION | | PRIORITY OF SELECTION | USABLE/ UNUSABLE |
| --- | --- | --- | --- | --- |
| | CENTER FREQUENCY | BANDWIDTH | | |
| A | ... | 20 MHZ | 1 | USABLE |
| B | ... | 20 MHZ | 1 | USABLE |
| C | ... | 20 MHZ | 2 | USABLE |
| D | ... | 20 MHZ | 2 | USABLE |
| E | ... | 20 MHZ | 3 | USABLE |

FIG. 5

| IMSI | AGGREGATION LEVEL INFORMATION | USED COMPONENT CARRIER INFORMATION |
|---|---|---|
| MOBILE TERMINAL DEVICE 21 | LEVEL 1 | A, B, C, D, E |
| MOBILE TERMINAL DEVICE 22 | LEVEL 2 | A, B, C, D, E |
| MOBILE TERMINAL DEVICE 23 | LEVEL 3 | A, C, D, E |
| ⋮ | ⋮ | ⋮ |

FIG. 6

| IMSI | ANCHOR CARRIER INFORMATION |
|---|---|
| MOBILE TERMINAL DEVICE 21 | B |
| MOBILE TERMINAL DEVICE 22 | D |
| MOBILE TERMINAL DEVICE 23 | E |
| ⋮ | ⋮ |

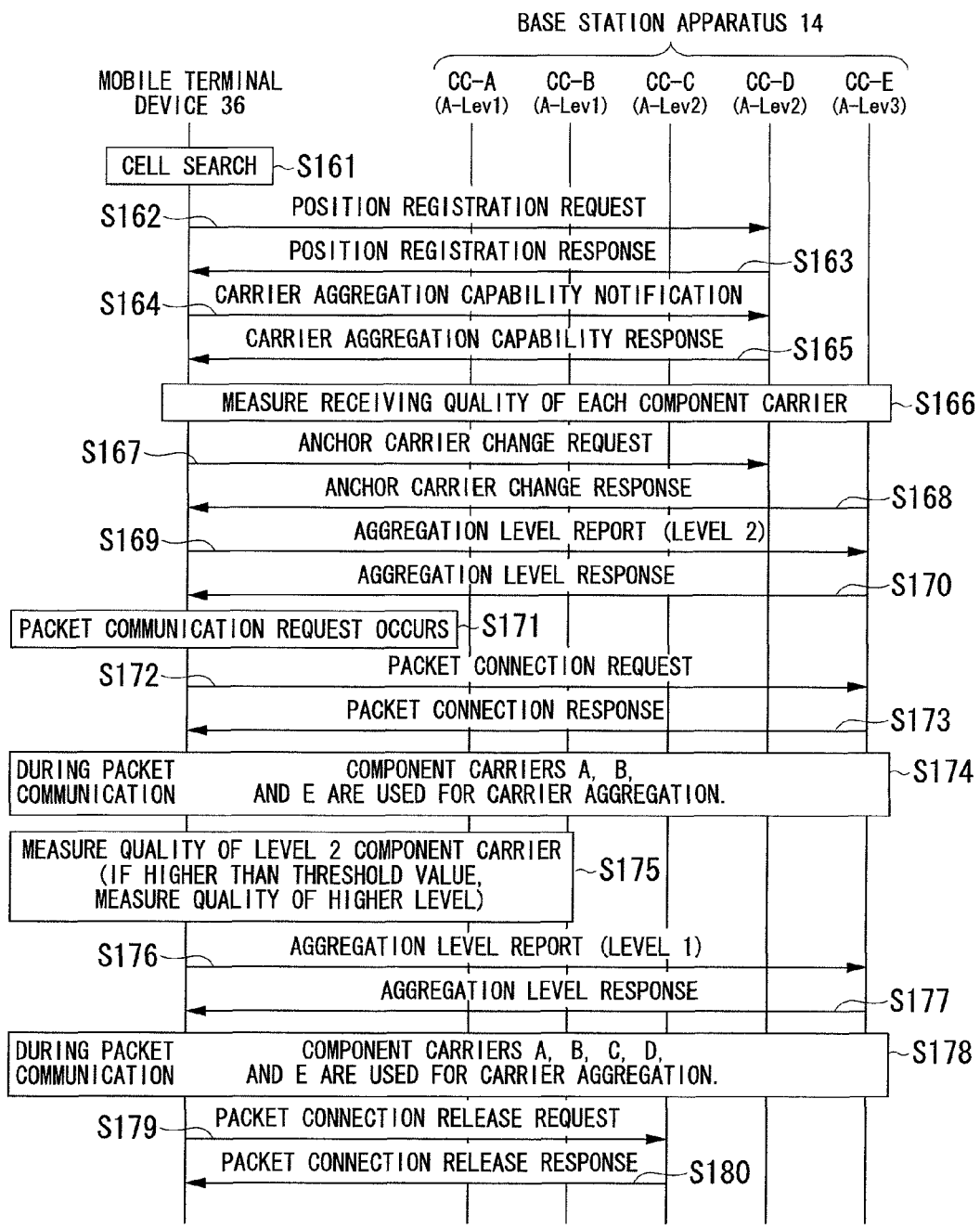

WIRELESS COMMUNICATION SYSTEM, WIRELESS COMMUNICATION APPARATUS, AND WIRELESS COMMUNICATION METHOD

TECHNICAL FIELD

The present invention relates to a wireless communication system, a wireless communication apparatus, and a wireless communication method.

The present application claims priority based on the patent application No. 2009-194610 filed in Japan on Aug. 25, 2009 and incorporates by reference herein the content thereof.

BACKGROUND ART

In 3GPP ($3^{rd}$ Generation Partnership Project), LTE-A (LTE-Advanced) is under study as the next communication method after LTE (Long-Term Evolution ($3^{rd}$ generation)). In LTE-A, in order to achieve communication at a higher speed than LTE, study is being conducted regarding communication using a 100-MHz frequency band that is broader than the 20-MHz frequency band used in LTE. However, because of existing frequency spectrum allocations to various applications, it is difficult to achieve a continuous allocation of frequency spectrum for LTE-A. It is also desirable to maintain compatibility with LTE as much as possible. Given these objectives, a proposal has been made for achieving a maximum 100-MHz frequency band by communicating on a plurality of frequency bands having widths that are 20 MHz or narrower, so as to perform carrier aggregation that achieves both high speed and high-capacity communication. This proposal has been agreed upon at a conference (3GPP RAN1#53b, refer to Non-Patent Document 1). In this carrier aggregation, carriers (frequency bands) up to 20 MHz are referred to as component carriers (CCs). There are future plans to establish detailed specifications with regard to signaling, channel placement, and mapping and the like in carrier aggregation.

In placing control channels on a downlink, a method that can be envisioned for maintaining compatibility with LTE is that of placing a PCFICH (Physical Control Format Indicator Channel), a PHICH (Physical Hybrid Automatic Repeat Request Indicator Channel, HARQ indicator channel), or PDCCH (Physical Downlink Control Channel) in each component carrier channel as the control channel. In this carrier aggregation method, if it is not established beforehand which component carrier is to be used to transmit control information, it is necessary for the terminal device to monitor a plurality of component carriers at the same time. It is therefore necessary for the receiving unit of the terminal device to wait for signals corresponding to frequency bands of a plurality of component carriers. For this reason, the power consumption of the terminal device increases in comparison with the case of waiting for a signal corresponding to frequency band of one component carrier.

In order to execute carrier aggregation, it is necessary to establish a new DCI (Downlink Control Information) format that sacrifices compatibility with LTE to some extent. When this is done, the control information for other channels is collected into one of the component carriers. By doing this, it is possible to reduce the amount of feedback of the acknowledge (ACKnowledge; ACK) signal and not-acknowledge (Not-ACKnowledge; NACK) signal in HARQ. In the case of using this method, since it is sufficient that a terminal device in the waiting state monitor only the one component carrier in which control information is stored, the power consumption of the terminal device can be reduced. Non-Patent Document 2 proposes, based on this method, a technique that uses Semi-Dynamic Triggering PDCCH to notify of component carriers which are aggregated. This Semi-Dynamic Triggering PDCCH includes a set of component carriers that are activated in the next subframe, and information regarding the effective period of this activation. An LTE-A terminal device that receives the Semi-Dynamic Triggering PDCCH can then monitor just the component carrier set that has been activated, up until the effective period, thereby enabling a reduction of the power consumption.

Non-Patent Document 3 indicates that, because communication on a plurality of component carriers increases the power consumption, it is desirable to communicate on one component carrier as much as possible.

Non-Patent Document 4 discloses an anchor carrier, which is a component carrier used as the basis for communicating control signals and the like.

PRIOR ART DOCUMENTS

Non-Patent Documents

Non-Patent Document 1: 3GPP, TR36.814 V0.4.1, Chapter 5

Non-Patent Document 2: 3GPP, "Issues on Carrier Aggregation for Advanced E-UTRA", R1-084443

Non-Patent Document 3: 3GPP, "Spectrum Aggregation Operations—UE Impact Considerations", R1-084405

Non-Patent Document 4: 3GPP, "PDCCH coding and mapping for carrier aggregation", R1-090682

DISCLOSURE OF INVENTION

Problem to be Solved by the Invention

However, there is no specific proposal given regarding a method for determining the anchor carrier, the component carrier corresponding thereto, or the component carriers that are subjected to carrier aggregation. For example, a method can be envisioned whereby the terminal device transmits the receiving quality to the base station apparatus for all of the component carriers, and the base station apparatus determines the component carriers for carrier aggregation based on these receiving qualities. In this case, however, the problem in which there is a large amount of communication exists, because of transmitting the propagation path condition information for all the component carriers.

The present invention was made in consideration of the above-noted situation, and has an object to provide a wireless communication system, a wireless communication apparatus, and a wireless communication method capable of determining, with a reduced amount of communication, the frequency bands to be used for communication.

Means for Solving the Problem

[1] The present invention is made to solve the above-described problem, a first aspect of the present invention is a wireless communication system including a first communication apparatus and a second communication apparatus, wherein the first communication apparatus includes: a first receiving unit that receives wireless signals in a plurality of frequency bands; a first information storing unit that stores a priority of selection of the frequency bands; a second information storing unit that stores information having a receiving quality level greater than a threshold in which the frequency band indicates lowest receiving quality and also information in which the priority of selection indicates the highest frequency bands; a first transmitting unit that transmits the information stored in the second information storing unit; and a communication control unit that controls the first transmitting unit to receive the data transmitted using the frequency band of the information that is stored in the second information storing unit and the frequency band having a lower priority of selection than that of the information that is stored in the second information storing unit, and wherein the second communication apparatus includes: a second receiving unit that receives the information transmitted by the first transmitting unit; and a second transmitting unit that transmits data in parallel using the frequency band having the highest priority of selection and the frequency band having a lower priority of selection than the frequency band having the highest priority of selection, based on the information received by the second receiving unit.

The term receiving quality as used herein refers to a value that indicates the receiving condition of a wireless signal in some frequency band. The first communication apparatus uses, for example, the reference signal received power per one resource block included in the received signal (RSRP: Reference Signal Received Power) as the receiving quality.

In this communication system, the receiving-side wireless communication apparatus (first communication apparatus) measures up to what frequency band the receiving quality is at least a threshold value, and notifies the transmitting-side wireless communication apparatus (second communication apparatus) of the frequency band having the highest priority of selection of the frequency bands for which the receiving quality is at least the threshold value. Using the frequency band that is expected to be equal to or better than the receiving quality of the notified frequency band and that has the same or lower priority of selection, the transmitting-side wireless communication apparatus and the receiving-side wireless communication apparatus perform communication. Because the receiving-side wireless communication apparatus notifies the transmitting-side wireless communication apparatus of the frequency bands usable for communication by notification of one frequency band, it is possible, with a smaller amount of communication, to determine the frequency bands to be used for communication.

[2] In the wireless communication system according to the first aspect of the present invention, the threshold values may be different for each of the frequency bands.

By making the threshold values different for each frequency band in this manner, it is possible to more appropriately switch the frequency bands. For example, in the case of using a receiving-side wireless communication apparatus indoors in an urban area, because of the influence of diffraction and reflection, there is a tendency for receiving quality to be better for a low frequency than for a high frequency. Given this, the wireless communication system uses a threshold value that is higher, the higher is the frequency of the frequency band. By doing this, in the case in which the receiving-side wireless communication apparatus is at a distance from the transmitting-side wireless communication apparatus, good communication can be expected by earlier switching to a frequency band having a low frequency.

[3] In the wireless communication system according to the first aspect of the present invention, the better is the expected receiving quality for the frequency band, the lower the priority may be.

The priority of selection lower, the better is the expected receiving quality of the frequency band in this manner. By doing this, it can be expected that all of the frequency bands having a threshold value indicating at least the minimum receiving quality and also the maximum priority of selection, and the frequency bands having a lower priority of selection will have at least the minimum receiving quality level. By communicating using those frequency bands, therefore, good communication can be expected.

[4] In the wireless communication system according to the first aspect of the present invention, the lower is the center frequency of the frequency band, the lower the priority may be.

In the case in which the wireless communication system performs communication in an environment having few obstacles, such as in a suburban area, it can be expected that, the lower the frequency of the frequency band is, the less is the propagation loss, and the better is the receiving quality. Even in the case in which the wireless communication system performs communication in an environment having many obstacles, such as in an urban area, it can be expected that, because of the influence of diffraction and transmissivity, the lower the frequency of the frequency band is, the better will be the receiving quality. Given this, by making the priority of selection lower, the lower is the center frequency of the frequency band, it is possible to lower the priority, the better is the expected receiving quality for the frequency band.

[5] In the wireless communication system according to the first aspect of the present invention, when good receiving quality cannot be expected even if the center frequency of the frequency band is low, the priority of the selection may be higher than that of another frequency band having a high center frequency.

By making the priority of the frequency band in which good receiving quality cannot be expected higher than that of other frequency bands, it is possible to make the priority lower, the better is the expected receiving quality for the frequency band.

[6] In the wireless communication system according to the first aspect of the present invention, the second transmitting unit of the second communication apparatus may use a frequency band having the highest priority of selection as the anchor carrier for transmitting control information for the plurality of the frequency bands together at once on the anchor carrier.

By using a high frequency band having a highest priority of selection as the anchor carrier, it is possible to avoid the frequency bands used in the second communication apparatus as anchor carriers being concentrated in one and the same frequency band. Also, because the second communication apparatus performs concentrated transmission of control information on one anchor carrier, it is possible to reduce the power consumption when the first communication apparatus is in the waiting state, by stopping the receiving units for the other frequency bands.

[7] In the wireless communication system according to the first aspect of the present invention, the second transmitting unit of the second communication apparatus may use a frequency band having the lowest priority of selection as the anchor carrier for transmitting control information for the plurality of the frequency bands together at once on the anchor carrier.

The frequency band having the lowest priority of selection is the frequency band expected to have the best receiving quality. By the second communication apparatus using the frequency band expected to have the best receiving quality to transmit control information, it is possible to expect that the first communication apparatus will receive the control information more reliably. Also, because the second communication apparatus does concentrated transmission of the control information on one anchor carrier, it is possible to reduce the power consumption when the first communication apparatus is in the waiting state, by stopping the receiving units for the other frequency bands.

[8] In the wireless communication system according to the first aspect of the present invention, in the case in which the receiving quality of the frequency band having the highest priority of selection is greater than the threshold value indicating good receiving quality, the communication control unit of the first communication apparatus may change the frequency band having the higher priority of selection to the frequency band having the highest priority of selection.

By making the frequency band having a higher priority of selection the frequency band having the highest priority of selection in this manner, it is possible to perform communication using more frequency bands. Because this wireless communication system changes the frequency band having the highest priority of selection in the case in which the receiving quality is good, it is possible to expect that the newly added frequency band also has good receiving quality, and that communication will be performed smoothly.

[9] In the wireless communication system according to the first aspect of the present invention, the second transmitting unit of the second communication apparatus may include the priority of selection in the notification signal that is common with the first communication apparatus and transmits the signal.

By the second communication apparatus including the priority of selection and transmitting the notification signal, it is not necessary to transmit the individual priorities of selection to the first communication apparatus. For this reason, it is possible to reduce the amount of communication compared with the case of transmitting the priorities of selection individually to the first communication apparatus.

[10] In the wireless communication system according to the first aspect of the present invention, one and the same priority of selection may be assigned to a plurality of frequency bands.

The wireless communication system associates a plurality of frequency bands with one and the same priority of selection. For example, frequency bands having mutually adjacent frequencies are associated with one and the same priority. The second communication apparatus selects the frequency band to be used as the anchor carrier, which is a frequency band for receiving the control information and the like, from the frequency bands having the highest priority of selection. By doing this, it is possible to avoid concentrating the frequency bands used by the second communication apparatus as the anchor carrier into one and the same frequency band.

[11] A second aspect of the present invention is a wireless communication apparatus including: a receiving unit that receives wireless signals in a plurality of frequency bands; a receiving quality measuring unit that measures the receiving quality of the plurality of wireless signals received by the receiving unit, with respect to each of the frequency bands; a frequency band selection unit that selects, from among the frequency bands having a measured receiving quality that is at least a pre-established threshold value, a frequency band having the highest priority of selection, which is a priority of selection that indicates the priority as lower, the better is the expected receiving quality for the frequency band; a transmitting unit that transmits a signal indicating the frequency band selected by the frequency band selecting unit; and a communication control unit that controls the receiving unit so that, of the plurality of frequency bands, transmitted data is received in parallel, using a frequency having the same priority of selection as the frequency band selected by the frequency band selecting unit and a frequency band having a lower priority of selection than the frequency of the frequency band having the same priority of selection as the frequency band selected by the frequency band selecting unit.

Of the usable frequency bands, the wireless communication apparatus transmits the frequency band having the highest priority of selection. Communication is performed using frequency bands having the same or lower priority of selection as this frequency band. By doing this, it is possible to determine, using a smaller amount of communication, the frequency band used for communication.

[12] In the wireless communication apparatus according to the second aspect of the present invention, the receiving unit may receive control information on a frequency band having the highest priority of selection among the frequency bands for reception.

By receiving the control information on a frequency band having the highest priority of selection in this manner, it is possible to avoid the frequency bands used by the wireless communication apparatus to receive control information concentrating on one and the same frequency band.

[13] In the wireless communication apparatus according to the second aspect of the present invention, the receiving unit may receive control information on a frequency band having the lowest priority of selection among the frequency bands for reception.

Because the frequency band having the lowest priority of selection is the frequency band expected to have the best receiving quality, it is possible for the wireless communication apparatus to receive the control information more reliably.

[14] A third aspect of the present invention is a wireless communication apparatus including: a receiving unit that receives a signal indicating a frequency band having the highest priority of selection among a plurality of frequency bands; and a transmitting unit that transmits data in parallel, using the frequency band having the highest priority of selection and a frequency band having a priority of selection lower than that of the frequency band having the highest priority of selection.

In this wireless communication apparatus, data is transmitted using frequency bands having the same or lower priority of selection as the frequency band indicated by the received signal. By doing this, it is possible, using a smaller amount of communication, to determine the frequency bands to be used for communication.

[15] In the wireless communication apparatus according to the third aspect of the present invention, the transmitting unit may transmit control information on a frequency band having the highest priority of selection among the frequency bands for transmission.

Control signal transmission is done on a frequency band having the highest priority of selection in this manner. By doing this, in the case in which control information is transmitted to a plurality of wireless communication apparatuses, it is possible to avoid the frequency bands used to transmit the control information concentrating on one and the same frequency band.

[16] In the wireless communication apparatus according to the third aspect of the present invention, the transmitting unit may transmit control information on a frequency band having the lowest priority of selection among the frequency bands for transmission.

Because the frequency band having the lowest priority of selection is the frequency band expected to have the best receiving quality, it is possible for a wireless communication apparatus that has received this control information to receive the control information more reliably.

[17] In the wireless communication apparatus according to the third aspect of the present invention, the transmitting unit may transmit the priority of selection.

The wireless communication apparatus itself transmits the priority of selection. For this reason, it is possible for it to determine the priority of selection and perform transmission in accordance with its own communication apparatus status, such as the positional relationship to another transmitting-side communication apparatus.

[18] A fourth aspect of the present invention is a wireless communication method including: receiving wireless signals in a plurality of frequency bands; measuring the receiving quality of the plurality of the received wireless signals, with respect to each of the frequency bands; selecting, from among the frequency bands having a measured receiving quality that is at least a pre-established threshold value, a frequency band having the highest priority of selection, which is a priority of selection that indicates the priority as lower, the better is the expected receiving quality for the frequency band; transmitting a signal indicating the frequency band that is selected; and controlling so that, of the plurality of frequency bands, transmitted data is received in parallel, using a frequency having the same priority of selection as the selected frequency band and a frequency band having a lower priority of selection than the frequency of the frequency band having the same priority of selection as the selected frequency band.

[19] A fifth aspect of the present invention is a wireless communication method including: receiving a signal indicating frequency band having the highest priority of selection among a plurality of frequency bands; and transmitting data in parallel, using the frequency band having the highest priority of selection and a frequency band having a priority of selection lower than that of the frequency band having the highest priority of selection.

Effects of the Invention

According to the present invention, it is possible to determine, using a smaller amount of communication, a frequency band to be used for communication.

BRIEF DESCRIPTION OF THE DRAWINGS

FIG. 3 is a table showing the data constitution of component carrier information stored by a frequency band information storing unit 241 in the first embodiment of the present invention.

FIG. 5 is a table showing the data constitution of aggregation information stored by an aggregation information storing unit 142 in the first embodiment of the present invention.

FIG. 6 is a table showing the data constitution of anchor carrier information stored by an anchor carrier information storing unit 143 in the first embodiment of the present invention.

FIG. 20 is a sequence diagram showing an example of the processing protocol whereby a mobile terminal device 36 starts and communicates with a base station apparatus 14 in the fourth embodiment of the present invention.

BEST MODE FOR CARRYING OUT THE INVENTION

First Embodiment

Embodiments of the present invention will be described below, with references made to the drawings.

Figure 1:
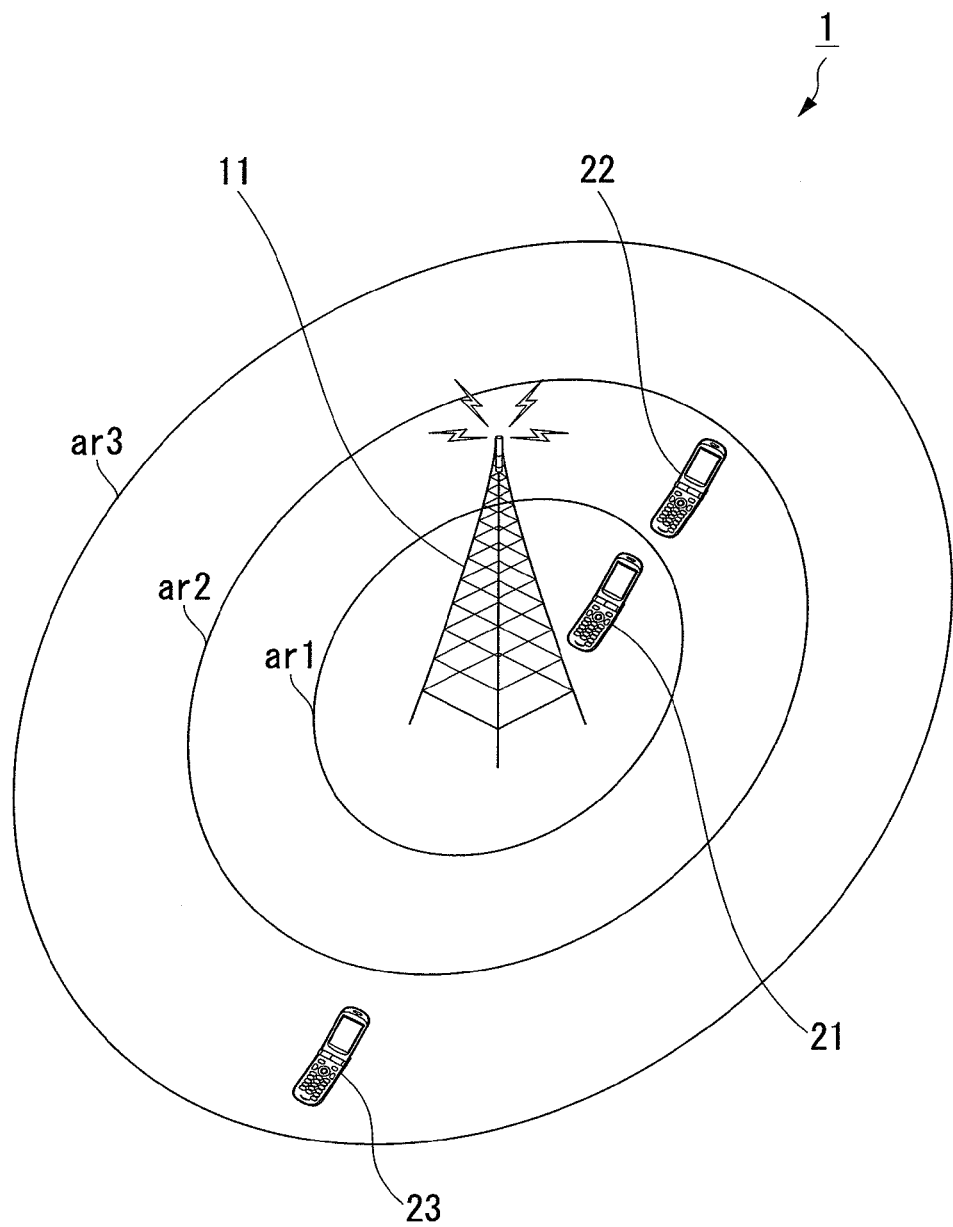
FIG. 1 is a system configuration drawing showing the general constitution of a wireless communication system 1 in a first embodiment of the present invention.

FIG. 1 is a system configuration drawing showing the general configuration of the wireless communication system 1 in the first embodiment of the present invention. The wireless communication system 1 shown in FIG. 1 includes a base station apparatus 11 (sometimes referred to as the second communication apparatus) and mobile terminal devices 21 to 23 (sometimes referred to as first communication apparatuses). The base station apparatus 11 transmits wireless signals to the mobile terminal devices 21 to 23 via a downlink (DL) that includes five component carriers, A to E (CC-A to CC-E). In this case, the term component carrier refers to a frequency band having a bandwidth of 20 MHz or narrower. The base station apparatus 11 transmits each of the component carriers to the mobile terminal devices 21 to 23 with the equivalent transmitting power. Although it is omitted from the drawing, the mobile terminal devices 21 to 23 transmit to the base station apparatus 11 via an uplink (UL).

The component carrier A and the component carrier B are frequency bands that are mutually adjacent, and the component carrier C and the component carrier D are frequency bands that are mutually adjacent. In the following, the frequency band that includes the component carrier A and the component carrier B is referred to as the frequency band F1, and the frequency band that includes the component carrier C and the component carrier D is referred to as the frequency band F2. The frequency band that includes the component carrier E is referred to as the frequency band F3. The frequency band F1 has a frequency that is higher than the frequency band F2. The frequency band F2 has a frequency that is higher than the frequency band F3. In the following, the high/low relationship between the frequencies of the frequency bands is indicated as F1>F2>F3. Although the frequency bands F1, F2, and F3 are not mutually adjacent, this is not a restriction.

The propagation loss of radio waves in free space is given by Equation (1).

$$\Gamma_L = 10 \log(4\pi d/\lambda)^2 \qquad \text{Equation (1)}$$

In Equation (1), $\pi$ is the ratio of the circumference to the diameter of a circle, d is the distance from the radio wave transmitting source, and $\lambda$ is the wavelength of the radio waves.

As shown in Equation (1), the propagation loss in free space is inversely proportional to the square of the wavelength. That is, the propagation loss in free space is proportional to the square of the frequency. Thus, for the same distance from the base station apparatus 11, which is the radio wave transmitting source, to the mobile terminal device 21, the lower the frequency of the frequency band is the smaller is the propagation loss, and the higher the frequency is the greater is the propagation loss. In actuality, in addition to the propagation loss related to the distance, there are the influences of terrestrial obstacles, such as buildings, trees, and mountains, and the antenna characteristics of the base station apparatus and the antenna characteristics of the mobile terminal devices. For this reason, although it is not reflected strictly by the Equation (1), there is a tendency for the propagation loss to be higher, the higher is the frequency. Therefore, the lower is the frequency band that the base station apparatus 11 uses, the broader is the service area that can be covered.

Therefore, the service area ar2 is broader than the service area ar1. The service area ar1 is the service area of the component carriers A and B that are included in the frequency band F1, which has the highest frequency. The service area ar2 is the service area of the component carriers C and D that are included in the frequency band F2. Additionally, the service area ar3 is broader yet than the service areas ar1 and ar2, and is the service area of the component carrier E that is included in the frequency band F3.

The mobile terminal device 21 is the closest to the base station apparatus 11, and is positioned within the service area ar1 of all of the component carriers A to E. For this reason, the mobile terminal device 21 can receive a signal from the base station apparatus 11 using all of the component carriers A to E. In contrast, the mobile terminal device 22 is positioned within the service area ar2 of the component carriers C to E. For this reason, the mobile terminal device 22 can receive a signal from the base station apparatus 11 using the component carriers C to E. The mobile terminal device 23 is the most distant from the base station apparatus 11, and is positioned within the service area ar3 of the component carrier E. For this reason, the mobile terminal device 23 can receive a signal from the base station apparatus using the component carrier E.

In the case of a plurality of component carriers being usable, it is possible to increase the communication speed by using a plurality of components. For example, by dividing the data desired to be transmitted by the base station apparatus 11, the divided data is transmitted in parallel using the component carrier B and the component carrier C. The mobile terminal device 21 receives the divided data via these component carriers, and links the divided data so as to obtain the desired data. By transmitting and receiving the data in parallel in this manner, it is possible to increase the communication speed.

Figure 2:
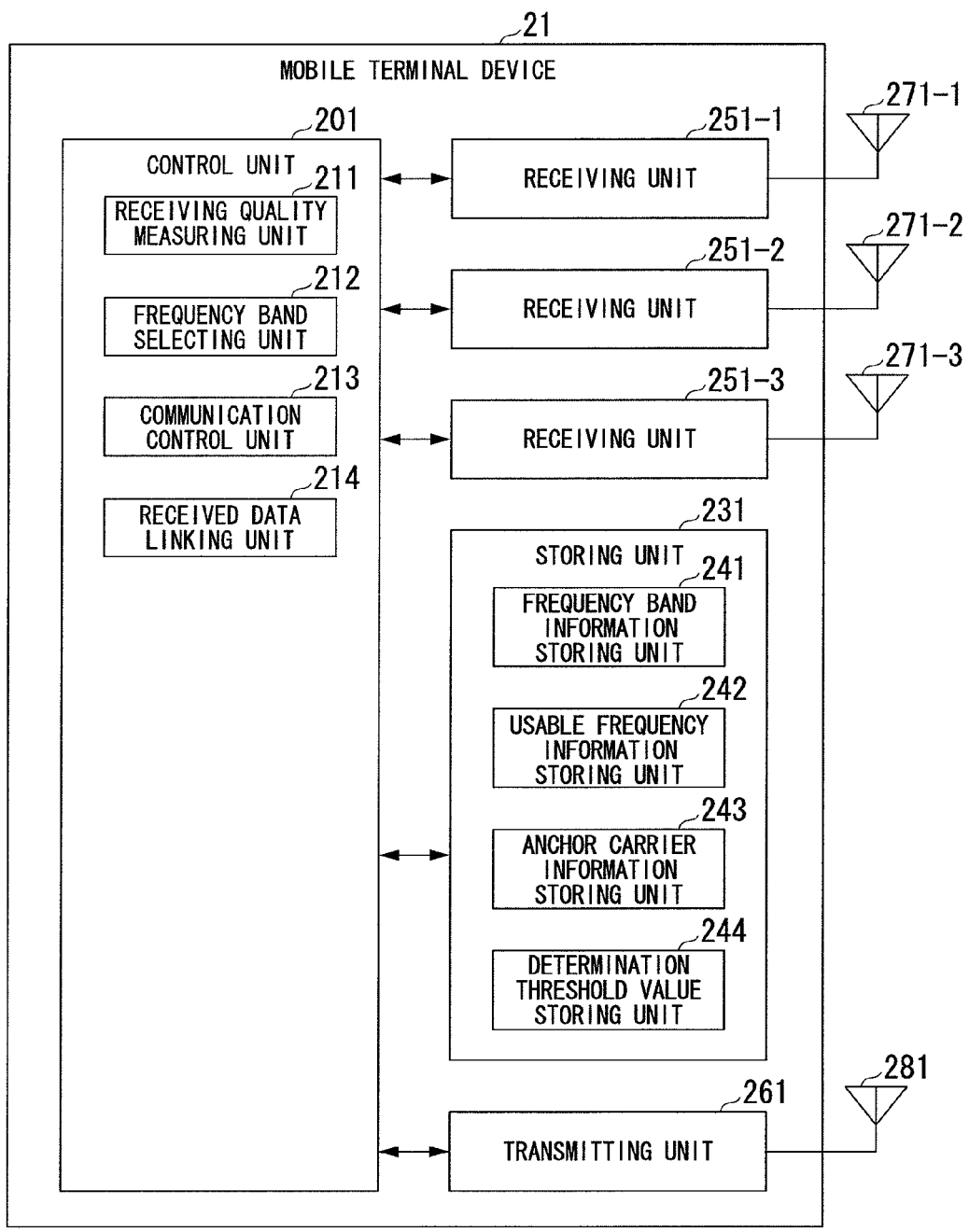
FIG. 2 is a functional block diagram showing the general constitution of a mobile terminal device 21 in the first embodiment of the present invention.

FIG. 2 is a functional block diagram showing the general constitution of the mobile terminal device 21.

In FIG. 2, the mobile terminal device 21 includes a control unit 201, a storing unit 231, receiving units 251-1 to 251-3 (first receiving units), a transmitting unit 261 (first transmitting unit), antennas 271-1 to 271-3, and an antenna 281. The control unit 201 includes a receiving quality measuring unit 211, a frequency band selecting unit 212, a communication control unit 213, and a received data linking unit 214. The storing unit 231 includes a frequency band information storing unit 241 (first information storing unit), a usable frequency information storing unit 242, an anchor carrier information storing unit 243 (second information storing unit), and a determination threshold value storing unit 244.

In the mobile terminal device 21, the control unit 201 controls the various parts of the mobile terminal device 21. The details of the control unit 201 will be described later. The storing unit 231 stores information used by the control unit 201. The details of the storing unit 231 will be described later.

The receiving unit 251-1 receives a signal via the antenna 271-1 and demodulates the received signal. The receiving unit 251-1 is a receiving unit that corresponds to the frequency band F1, and that receives and demodulates a signal transmitted using the component carrier A and a signal transmitted using the component carrier B. The receiving unit 251-1 outputs the received data obtained by demodulation to the control unit 201. The receiving unit 251-1 includes a wireless (RF: radio frequency) unit (not shown) and two baseband units (not shown). The wireless unit of the receiving unit 251-1 performs receiving processing on the component carrier A signal and the component carrier B signal. The two baseband units of the receiving unit 251-1 perform baseband processing of the respective component carrier A signal and component carrier B signal.

The receiving unit 251-2 receives a signal via the antenna 271-2 and demodulates the received signal. The receiving unit 251-2 is a receiving unit that corresponds to the frequency band F2, and that receives and demodulates a signal transmitted using the component carrier C and a signal transmitted using the component carrier D. The receiving unit 251-2 outputs the received data obtained by demodulation to the control unit 201. The receiving unit 251-2 includes a wireless unit (not shown), a first baseband unit (not shown), and a second baseband unit (not shown). The wireless unit of the receiving unit 251-2 performs receiving processing on the component carrier C signal and the component carrier D signal. The first baseband unit of the receiving unit 251-2 performs baseband processing of the component carrier C signal, and the second baseband unit of the receiving unit 251-2 performs baseband processing of the component carrier D signal.

The receiving unit 251-3 receives a signal via the antenna 271-3 and demodulates the received signal. The receiving unit 251-3 is a receiving unit that corresponds to the frequency band F3, and that receives and demodulates a signal transmitted using the component carrier E. The receiving unit 251-3 outputs the received data obtained by demodulation to the control unit 201. The receiving unit 251-3 includes a wireless unit (not shown) and a baseband unit (not shown). The wireless unit of the receiving unit 251-3 performs receiving processing on the component carrier E signal. The baseband unit of the receiving unit 251-3 performs baseband processing of the component carrier E signal.

Each of the receiving units includes a number of baseband units corresponding to the number receivable component carriers. In the first embodiment, for example, there are two component carriers, A and B, included in the frequency band F1. For this reason, the receiving unit 251-1 that corresponds to the frequency band F1 includes two baseband units such as described above. In contrast, in the case in which there is a possibility of four component carriers being included in the frequency band F1, the receiving unit 251-1 would include four baseband units. In the case in which the two component carriers component carrier A and component carrier B are included in the frequency band F1, the receiving unit 251-1 would perform receiving processing using two of the above-noted four baseband units.

The mobile terminal device 21 includes a number of receiving units corresponding to the number of received frequency bands. In the first embodiment, for example, the mobile terminal device 21 includes the three receiving units 251-1 to 251-3. In contrast, the mobile terminal device 21 may be provided with a greater number of receiving units, enabling accommodation of a number of frequency bands that is the same as the number of receiving units.

The mobile terminal device 21 may include a number of receiving units that differs from the number of transmitting units of the base station apparatus 11 to be described later. For example, in the case in which the base station apparatus 11 includes four transmitting units, the mobile terminal device 21 may include three receiving units. In this case, the base station apparatus 11, of the basebands that it itself can transmit, transmits a signal using a baseband that is receivable by the mobile terminal device 21.

The transmitting unit 261 transmits a signal to the base station apparatus 11 using the uplink UL, via the antenna 281.

Although neither illustrated nor described, the mobile terminal device 21 includes various known units other than noted above, such as a display unit for displaying images and characters, and an operating unit for receiving operation inputs.

Because the constitutions of the mobile terminal device 22 and the mobile terminal device 23 are the same as the mobile terminal device 21, their illustration and descriptions are omitted herein.

In the storing unit 231, the frequency band information storing unit 241 stores the frequency band information and priority of selection for each component carrier as component carrier information usable by the base station apparatus 11. This frequency band information includes information regarding the center frequencies and bandwidths. The priority of selection is also referred to as the (carrier) aggregation level. From the propagation loss frequency characteristics, it is expected that the receiving quality will be better, the lower the frequency is. Given this, in the first embodiment the priority of selection is made lower, the lower the frequency is.

The priority of selection is the priority of a frequency band, and the lower the priority is, the better is the expected receiving quality for the frequency band. The priority of selection used in the wireless communication system 1 has a maximum value of 1, and is lower the larger this value is.

The usable frequency information storing unit 242 stores information indicating the component carriers usable by the mobile terminal device 21 itself.

The anchor carrier information storing unit 243 stores information indicating the component carrier being used by the mobile terminal device 21 itself as an anchor carrier.

The determination threshold value storing unit 244 stores the receiving quality threshold value for each frequency band. The determination threshold value storing unit 244 stores the threshold value Fi-L ($1 \leq i \leq 3$) and the threshold value Fi-H ($1 \leq i \leq 3$) for each frequency band. The threshold value Fi-L is a threshold value for determination of not using a component carrier in carrier aggregation if the receiving quality thereof deteriorates. The threshold value Fi-H is a threshold value for determination of using a component carrier in carrier aggregation if the receiving quality thereof is good. In the following, the threshold value Fi-L ($1 \leq i \leq 3$) will also be referred to as the downlink threshold or the threshold indicating the minimum receiving quality level. The threshold value Fi-L is a threshold value for determination of not using a component carrier in carrier aggregation if the receiving quality thereof deteriorates. The threshold value F1-L is also described as the threshold value CC-A-L or the threshold value CC-B-L. The threshold value F2-L is also described as the threshold value CC-C-L or the threshold value CC-D-L. The threshold value F3-L is also described as the threshold value CC-E-L. The threshold value F1-H is also described as the threshold value CC-A-H or the threshold value CC-B-H. The threshold value F2-H is also described as the threshold value CC-C-H or the threshold value CC-D-H. The threshold value F3-L is also described as the threshold value CC-E-H.

The determination threshold value storing unit 244 stores pre-established default threshold values for each frequency band. Additionally, when notified from the base station apparatus 11 of a threshold value, the determination threshold value storing unit 244 stores that threshold value. In the case of the determination threshold value storing unit 244 storing a threshold value notified to it by the base station apparatus 11, the control unit 201 uses that threshold value. In the case in which the determination threshold value storing unit 244 has not stored a threshold value notified to it by the base station apparatus 11, the control unit 201 uses the default threshold value stored by the determination threshold value storing unit 244. In this manner, the determination threshold value storing unit 244 stores the default threshold values. By doing this, the base station apparatus 11 that uses a pre-established default threshold value does not give notification of a threshold value, thereby reducing the amount of overhead to transmit threshold values. In the case in which, based on the setting status of the base station apparatus 11, a threshold value characteristic to the base station apparatus 11 is set, the base station apparatus 11 transmits the threshold value to the mobile terminal device 21. As will be described later, in the case in which the base station apparatus 11 transmits a threshold value common to all the component carriers or transmits threshold values individually for each component carrier, the determination threshold value storing unit 244 stores the threshold value common to all the component carriers or the threshold values individually for each component carrier.

In the control unit 201, a receiving quality measuring unit 211 measures the receiving quality of the signals received by the receiving units 251-1 to 251-3 regarding each of the component carriers.

The receiving quality measuring unit 211 measures the received power for one resource block of a reference signal (RSRP: Reference Signal Received Power) transmitted by the base station apparatus 11 as the receiving quality. The receiving quality measuring unit 211 may measure the received field strength of a reference signal over the entire component carrier (RSSI: Received Signal Strength Indicator) as the receiving quality. Alternatively, the receiving quality measuring unit 211 may measure the receiving quality of the reference signal calculated by N×RSRP/RSSI ((RSRQ: Reference Signal Received Quality) as the receiving quality. In this calculation, N is the number of resource blocks within the target component carrier. During transmission, the receiving quality measuring unit 211 may measure the channel quality information (CQI: Channel Quality Indicator) as the receiving quality.

The frequency band selecting unit 212 reads out from the determination threshold value storing unit 244 the threshold value CC-x-L (x=A to E) indicating the minimum receiving quality. The frequency band selecting unit 212 selects a component carrier for which the receiving quality measured by the receiving quality measuring unit 211 is at least the read-out threshold value CC-x-L (x=A to E). The frequency band selecting unit 212 reads out from the frequency band information storing unit 241 the priority of selection information. The frequency band selecting unit 212, in accordance with the read-out priority of selection information, selects a component carrier having the highest associated priority of selection from among the component carriers for which the receiving quality is at least the corresponding threshold value CC-x-L (x=A to E). The frequency band selecting unit 212 writes information indicating the selected component carrier into the anchor carrier information storing unit 243 of the storing unit 231 as information indicating the anchor carrier. The frequency band selecting unit 212 inputs information indicating the selected component carrier to the transmitting unit 261 as information indicating the anchor carrier.

The communication control unit 213 controls the receiving units 251-1 to 251-3 so as to receive wireless signals of a component carrier having the same or lower priority of selection as that of the component carrier selected by the frequency band selecting unit 212.

The received data linking unit 214 links the data demodulated by the receiving units 251-1 to 251-3 so as to reproduce the desired transmitted data. The data demodulated by the receiving units 251-1 to 251-3 is the desired transmitted data that is divided and transmitted by the base station apparatus 11 on each of the component carriers. The received data linking unit 214 links this data to reproduce the desired transmitted data. The base station apparatus 11 may also be made to transmit individual data for each component carrier. In this case, the received data demodulated by the receiving units 251-1 to 251-3 are the desired transmitted data for each of the component carriers. In this case, the received data linking unit 214 performs no operation with respect the received data.

The mobile terminal device 21 (FIG. 2) according to the first embodiment has the receiving units 251-1 to 251-3, the receiving quality measuring unit 211, the frequency band selecting unit 212, the transmitting unit 261, and the communication control unit 213.

The receiving units 251-1 to 251-3 receive wireless signals in a plurality of frequency bands from the base station apparatus 11.

The receiving quality measuring unit 211 measures the receiving quality of the plurality of wireless signals received by the receiving units 251-1 to 251-3, with regard to each frequency band.

The frequency band selecting unit 212 selects, from the frequency bands having the measured receiving quality that is at least a pre-established threshold value, a frequency band having the highest priority of selection, which is a frequency band priority that indicates the priority as lower, the better is the expected receiving quality for the frequency band.

The transmitting unit 261 transmits to the base station apparatus 11 a signal indicating the frequency band selected by the frequency band selecting unit 212.

The communication control unit 213 controls the receiving units 251-1 to 251-3 so that, of the plurality of frequency bands, transmitted data is received in parallel, using a frequency band of a frequency having the same priority of selection as the frequency band selected by the frequency band selecting unit 212 and a frequency band of a frequency having a lower priority of selection than the frequency of the frequency band having the same priority of selection as the frequency band selected by the frequency band selecting unit 212.

In the mobile terminal device 21 according to the first embodiment, the receiving units 251-1 to 251-3 may receive control information on frequency band having the highest priority of selection among the frequency bands for reception.

Also, in the mobile terminal device 21 according to the first embodiment, the receiving units 251-1 to 251-3 may receive control information on frequency band having the lowest priority of selection among the frequency bands for reception.

FIG. 3 is a table showing the data constitution of the component carrier information stored by the frequency band information storing unit 241. The frequency band information storing unit 241 stores component carrier information in a table format. Each line of data in the table format shown in FIG. 3 corresponds to one component carrier.

In FIG. 3, the component carrier information includes a component carrier identifier (ID), a center frequency, a bandwidth, a priority of selection, and indication of usable/unusable. The control unit 201 searches the component carrier information using the component carrier identifier as a key.

The component carrier identifier is data used to identify each of the component carriers. The center frequency is the frequency at the center of the frequency band used by the component carrier. The bandwidth is the bandwidth of the frequency band used by the component carrier. The center frequency and the frequency band are collectively referred to as the frequency bandwidth information. The priority of selection is the priority of selection associated with the component carrier. Usable/unusable indicates whether a component carrier is currently usable or unusable.

Figure 4:
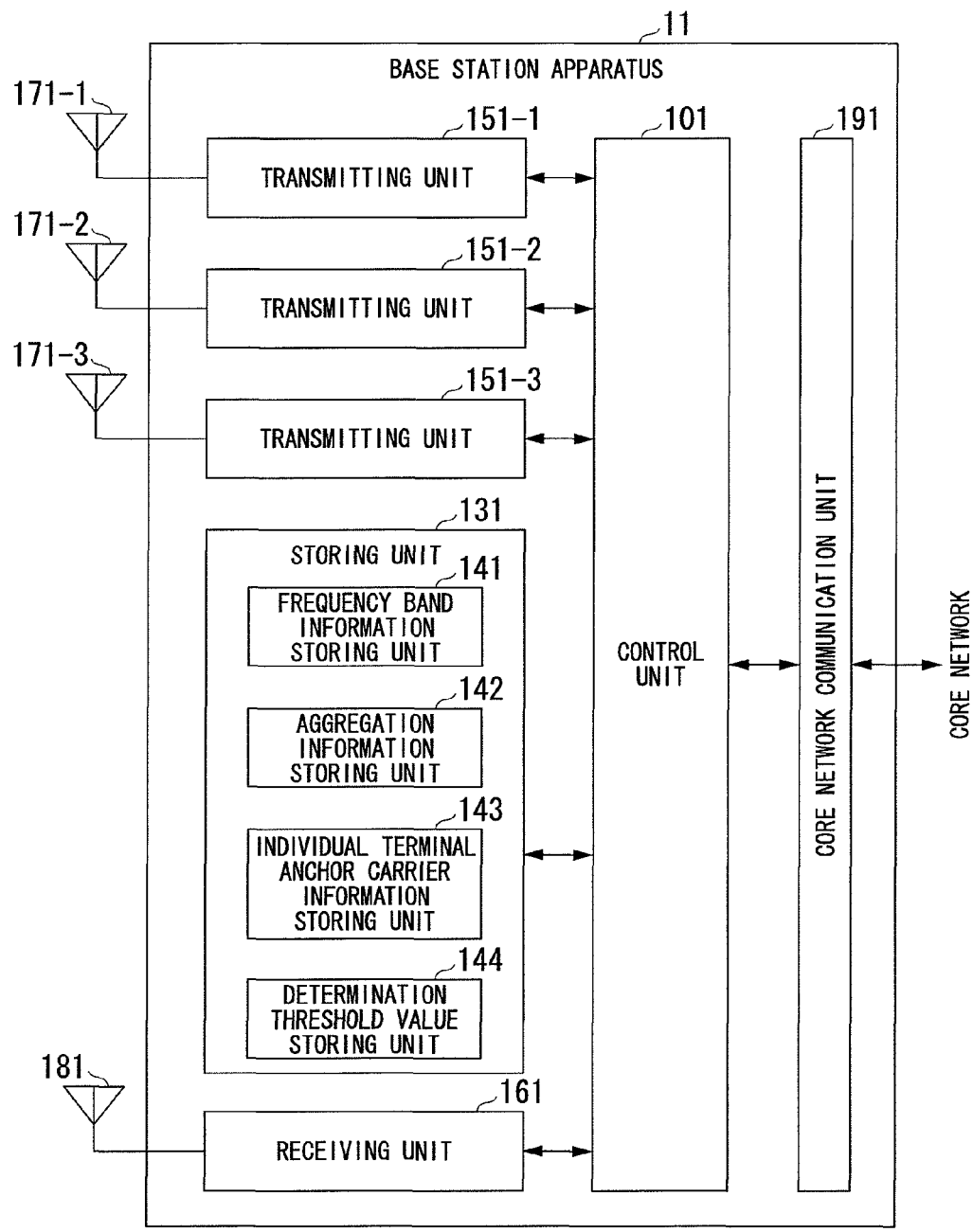
FIG. 4 is a functional block diagram showing the general constitution of a base station apparatus 11 in the first embodiment of the present invention.

FIG. 4 is a functional block diagram showing the general constitution of the base station apparatus 11.

In FIG. 4, the base station apparatus 11 includes control unit 101, the storing unit 131, transmitting units 151-1 to 151-3 (second transmitting units), a receiving unit 161 (second receiving unit), antennas 171-1 to 171-3 and 181, and a core network (CN) communication unit 191. The storing unit 131 includes a frequency band information storing unit 141 (first information storing unit), an aggregation information storing unit 142 (second information storing unit), an individual terminal anchor carrier information storing unit 143, and a determination threshold value storing unit 144.

In the base station apparatus 11, the control unit 101 controls the various parts of the base station apparatus 11.

The transmitting units 151-1 to 151-3 modulate the transmitted data transmitted by the base station apparatus to the mobile terminal devices 21 to 23 and convert the data to wireless signals. The transmitting units 151-1 to 151-3 then transmit the converted signals via the respective antennas 171-1 to 171-3. The transmitting unit 151-1 transmits using the component carrier A and the component carrier B. The transmitting unit 151-2 transmits using the component carrier C and the component carrier D. The transmitting unit 151-3 transmits using the component carrier E.

The receiving unit 161 receives, via the antenna 181, the signals transmitted from the mobile terminal devices 21 to 23 using the uplink. The receiving unit 161 demodulates the received signals.

The core network communication unit 191 connects to and communicates with the core network. The core network communication unit 191 receives from the core network data to be transmitted to the mobile terminal devices 21 to 23, and transmits the data to the mobile terminal devices 21 to 23, via the control unit 101, the transmitting units 151-1 to 151-3, and the antennas 171-1 to 171-3. The core network communication unit 191 also transmits to the core network the data that is transmitted by the mobile terminal devices 21 to 23.

In the storing unit 131, the frequency band information storing unit 141, similar to the frequency band information storing unit 241 of the mobile terminal device 21 (FIG. 2), stores the component carrier information that the base station apparatus 11 itself can use. The frequency band information storing unit 141, however, does not store usable/unusable. The frequency band information storing unit 141 stores a pre-established priority of selection as the priority of selection for each component carrier. As shown in FIG. 3, the frequency band information storing unit 141 stores a higher priority of selection, the higher is the frequency of the component carrier. The frequency band information stored by the frequency band information storing unit 141 is not restricted to being a higher priority of selection, the higher is the frequency of the component carrier. Details will be described later.

The aggregation information storing unit 142 stores aggregation information. In this case, the term aggregation information refers to information regarding carrier aggregation that can be executed in communication from the base station apparatus 11 to the mobile terminal devices 21 to 23.

The base station apparatus 11 (FIG. 4) according to the first embodiment has the receiving unit 161 and the transmitting units 151-1 to 151-3.

The receiving unit 161 receives from the mobile terminal devices 21 to 23 a signal indicating, of the plurality of frequency bands, the frequency band that has the highest priority of selection.

The transmitting units 151-1 to 151-3 perform parallel data communication and transmission to the mobile terminal devices 21 to 23, using the frequency band having the highest priority of selection, and a frequency band having a priority of selection that is lower than that of the frequency band having the highest priority of selection.

In the base station apparatus 11 according to the first embodiment, the transmitting units 151-1 to 151-3 may transmit control information to the mobile terminal devices 21 to 23 on a frequency band having the highest priority of selection among the frequency bands for transmission.

In the base station apparatus 11 according to the first embodiment, the transmitting units 151-1 to 151-3 may transmit control information to the mobile terminal devices 21 to 23 on a frequency band having the lowest priority of selection among the frequency bands for transmission.

In the base station apparatus 11 according to the first embodiment, the transmitting units may be such that they transmit the priority of the priority of selection to the mobile terminal devices 21 to 23.

FIG. 5 is a table showing the data constitution of aggregation information stored by the aggregation information storing unit 142. The aggregation information storing unit 142 stores aggregation information in a table format. Each line of data in the table format shown in FIG. 5 corresponds to one mobile terminal device.

In FIG. 5, the aggregation information includes an IMSI (International Mobile Subscriber Identity), aggregation level information, and component carrier information to be used. The control unit 101 searches the aggregation information using the IMSI as a key.

The IMSI is an identifier that identifies each mobile terminal device. The aggregation level information is information indicating the current aggregation level of the mobile terminal device. The component carrier information to be used is information indicating the component carriers to be used in carrier aggregation.

As an identifier to identify the mobile terminal devices, the aggregation information storing unit 142 may store information other than IMSI, such as the TMSI (Temporary Mobile Subscriber Identity) or the MSISDN (Mobile Subscribed ISDN Number).

FIG. 6 is a table showing the data constitution of anchor carrier information stored by the individual terminal anchor carrier information storing unit 143. The individual terminal anchor carrier information storing unit 143 stores anchor carrier information as data in a table format. Each line of data in the table format shown in FIG. 6 corresponds to one mobile terminal device.

In FIG. 6, the anchor carrier information includes the IMSI and anchor carrier information. The control unit 101 searches the anchor carrier information using the IMSI as a key.

The IMSI is an identifier that identifies each mobile terminal device. The anchor carrier information is information indicating the component carrier to be used as the anchor carrier of the mobile terminal device.

In the same manner as the aggregation information storing unit 142, the individual terminal anchor carrier information storing unit 143 may store as an identifier to identify the mobile terminal devices, information other than the IMSI, such as the TMSI, or the MSISDN.

Figure 7:
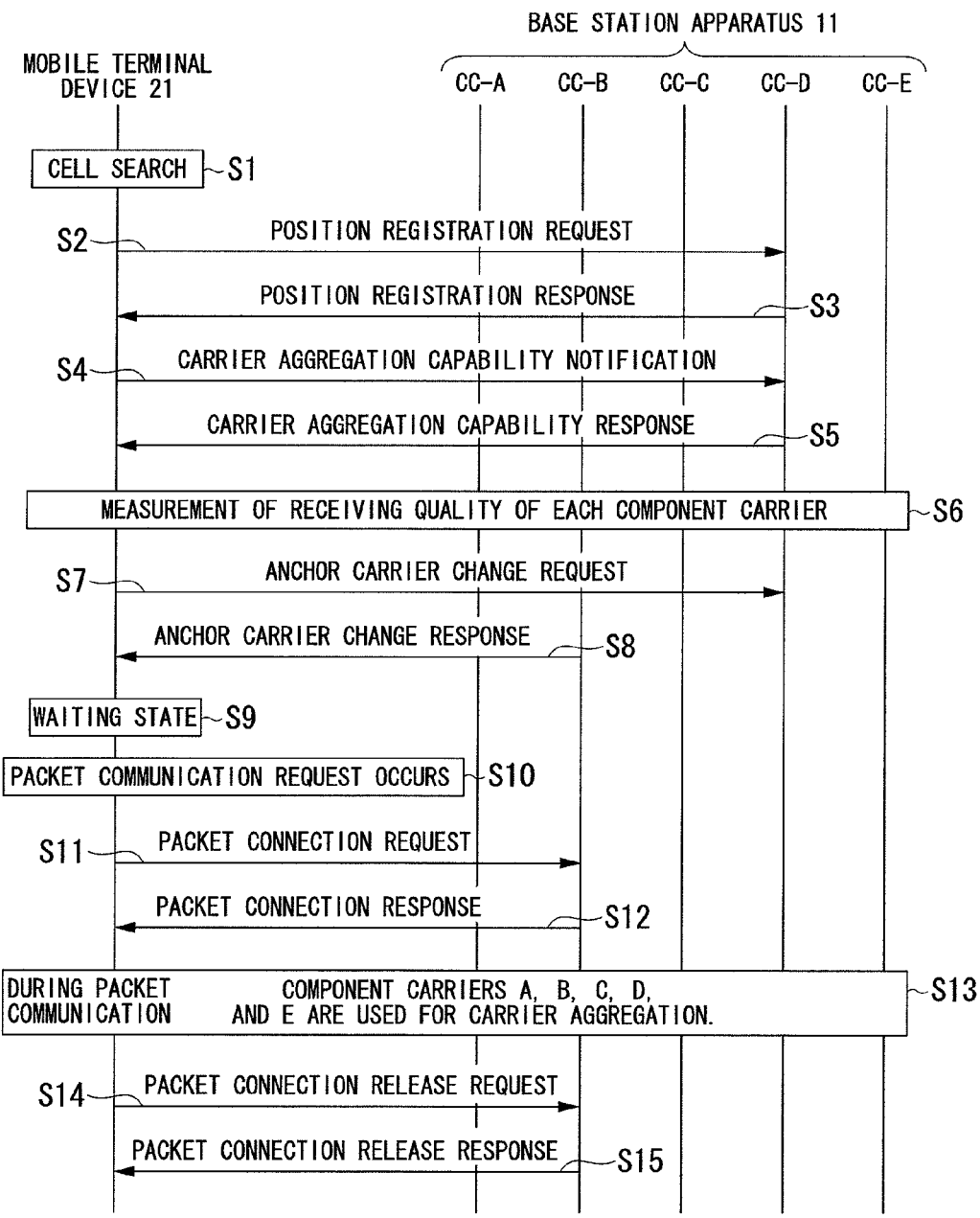
FIG. 7 is a sequence diagram showing an example of the processing protocol performed when the mobile terminal device 21 starts and communicates with the base station apparatus 11 in the first embodiment of the present invention.

FIG. 7 is a sequence diagram showing an example of the communication protocol when the mobile terminal device 21 starts and communicates with the base station apparatus 11. The component carriers used by the base station apparatus 11 and the mobile terminal device 21 in performing communication are indicated on the base station apparatus 11 side. The mobile terminal device 21 uses the uplink to communicate with the base station apparatus 11. Carrier aggregation is not performed on this uplink. The mobile terminal device 21 performs communication using, of a plurality of uplinks, an uplink that corresponds to one of the component carriers. In FIG. 7, uplink communication is indicated by the arrows pointing to the component carriers corresponding to the uplinks used by the mobile terminal device 21. This also applies to subsequent sequence diagrams.

As described above, the base station apparatus 11 transmits a downlink signal using the five component carriers A to E. The component carrier A and the component carrier B are included in the frequency band F1, and the carrier aggregation level thereof is set as "Level 1." The component carrier C and the component carrier D are included in the frequency band F2, and the carrier aggregation level thereof is set as "Level 2." The component carrier E is included in the frequency band F3, and the carrier aggregation level thereof is set as "Level 3." The base station apparatus 11 transmits synchronization signals and broadcast information in the same manner for all the component carriers A to E. The base station apparatus 11 accepts processing such as position registration and camp-on on an uplink that corresponds to one of the component carriers A to E. The term camp-on in used here refers to the state in which the position of the mobile terminal device 21 is registered in the base station apparatus 11 and the mobile terminal device 21 can receive service from the base station apparatus 11.

The mobile terminal device 21 starts the processing of FIG. 7 when the power supply is applied.

At sequence S1 the mobile terminal device 21 performs a cell search. The mobile terminal device 21 performs a cell search in the same manner as in a conventional case in which carrier aggregation is not performed, such as in LTE. Specifically, the communication control unit 213 first receives synchronization signals via the receiving units 251-1 to 251-3, and establishes synchronization with the signal of the base station apparatus 11. The base station apparatus 11 can use the component carriers A to E in carrier aggregation, and includes in the broadcast information the information that is all the usable component carriers included in the broadcast information, and sends the broadcast information. Next, the communication control unit 213 receives, via the receiving units 251-1 to 251-3, the broadcast information transmitted by the base station apparatus 11, and reads out various parameters required for communication with the base station apparatus 11. The communication control unit 213 reads out, from the broadcast information, information of the component carrier that are usable in carrier aggregation. The base station apparatus 11 stores the information of the usable component carriers in the frequency band information storing unit 141. The base station apparatus 11 includes the information read out from the frequency band information storing unit 141 in the broadcast information and transmits the broadcast information.

The communication control unit 213 reads out the information of the component carriers usable in carrier aggregation from the received broadcast information, and writes it into the frequency band information storing unit 241.

In the case in which there is a plurality of base station apparatuses capable of receiving the synchronization signal and the broadcast information, the communication control unit 213 performs the above-noted processing with regard to all the base station apparatuses among the plurality of base station apparatus having a possibility of performing the position registration.

At sequence S2, the mobile terminal device 21 selects from the base station apparatuses found by the cell search a base station apparatus to be connected to, and transmits a position registration request. In the example of FIG. 7, the mobile terminal device 21 transmits a position registration request to the base station apparatus 11. The mobile terminal device 21 determines the component carrier to perform position registration in accordance with the signal receiving conditions. The broadcast information includes information regarding the transmitting frequency. The mobile terminal device 21 reads out information regarding the transmitting frequency from the broadcast information. The mobile terminal device 21 transmits to the base station apparatus using the transmitting frequency indicated by the read-out information and resisters the position. In the example of FIG. 7, the mobile terminal device 21 receives the broadcast information on the component carrier D, and transmits to the base station apparatus 11 on the thus notified transmitting frequency. From the frequency or the frequency and timing of the received position registration request, the base station apparatus 11 makes a determination of what component carrier the mobile terminal device 21 is receiving. Thereafter, the mobile terminal device 21 and the base station apparatus 11 communicate by the component carrier D and perform processing necessary for position registration.

At sequence S3, having completed processing for position registration, the base station apparatus 11 transmits a position registration response to the mobile terminal device 21 that had transmitted the position registration request. When this is done, the base station apparatus 11 transmits the position registration response on the component carrier D that was determined from the frequency of the position registration request or the like.

At sequence S4, the mobile terminal device 21 that received the position registration response transmits a carrier aggregation capability notification to the base station apparatus 11. Specifically, the frequency band selecting unit 212 reads out from a frequency band information storing unit 241 information of component carriers transmittable by the base station apparatus 11. The frequency band selecting unit 212 reads out from the usable frequency information storing unit 242 the information of component carriers usable by the local mobile terminal device 21. The frequency band selecting unit 212 compares both of the read-out information. The frequency band selecting unit 212 includes information indicating, of the component carriers transmittable by the base station apparatus 11, the component carriers included in the frequency band stored by the usable frequency information storing unit 242 in the carrier aggregation capability notification and transmits the information to the base station apparatus 11.

At the sequence S5, the base station apparatus 11 transmits a carrier aggregation capability response to the mobile terminal device 21. Specifically, first the base station apparatus 11 reads out information indicating the usable component carriers from the carrier aggregation capability notification transmitted by the mobile terminal device 21. Then, the base station apparatus 11 writes this into the aggregation information storing unit 142 as the frequency used by the mobile terminal device 21 in carrier aggregation. The base station apparatus 11 determines, of the component carriers usable in carrier aggregation transmitted from the mobile terminal device 21, the component carrier actually to be used in carrier aggregation, and writes this into the aggregation information storing unit 142. At this point, the base station apparatus 11 may use all of the usable component carriers transmitted from the mobile terminal device 21 in carrier aggregation. Also, the base station apparatus 11 may use only a part of the component carriers, in accordance with the communication condition and the like with another mobile terminal device.

The base station apparatus 11 sets the threshold value for determining whether or not a component carrier is usable in carrier aggregation. The base station apparatus 11 sets two types of threshold values, the threshold value CC-x-L and the threshold value CC-x-H. The threshold value CC-x-L is the threshold value for determining that the component carrier is not to be used in carrier aggregation, in the case in which the receiving quality deteriorates. The threshold value CC-x-H is the threshold value for determining that the component carrier is to be used in carrier aggregation, in the case in which the receiving quality is good. The base station apparatus 11, sets the threshold values CC-x-L and CC-x-H for each of the frequency bands. The base station apparatus 11 may set the threshold values in common for all component carriers. Alternatively, the base station apparatus 11 may set the threshold values for each component carrier in accordance with the radio wave conditions in the area of the local base station apparatus 11. For example, by setting a high threshold value for a component carrier that is susceptible to noise, it is possible to prevent beforehand failed communication.

The base station apparatus 11 stores the set threshold values in association with the IMSI of the mobile terminal devices into the determination threshold value storing unit 144. Similar to the aggregation information storing unit 142, the base station apparatus 11 may store the TMSI or MSIDN or the like instead of the IMSI. After setting the threshold values, the base station apparatus 11 uses the component carrier D to transmit the carrier aggregation capability response to the mobile terminal device 21. The carrier aggregation capability response includes information indicating the component carriers actually to be used in carrier aggregation for communication to the mobile terminal device 21, and information indicating the priority of selection of each component carrier and the threshold values for the purpose of determining the receiving quality. The base station apparatus 11 reads out the priorities of selection of the component carriers from the frequency band information storing unit 141, reads out the threshold values from the determination threshold value storing unit 144, includes these in carrier aggregation capability response, and transmits the response.

The base station apparatus 11 may be made to include the priorities of selection in the notification signal and transmit the notification signal. In this case, the communication control unit 213 of the mobile terminal device 21 reads out the priority of selection from the notification signal at sequence S1, and writes it into the frequency band information storing unit 241. By doing this, because the base station apparatus 11 need not transmit the priority of selection to the mobile terminal device individually, it is possible to reduce the amount of communication in comparison with the case in which the priority of selection is transmitted to the mobile terminal device individually.

In the case in which the number of mobile terminal devices communicating with the base station apparatus 11 is large, it is possible to particularly reduce the amount of communication.

The communication control unit 213 of the mobile terminal device 21 that has received a carrier aggregation capability response reads out from the carrier aggregation capability response information indicating the component carriers actually to be used in carrier aggregation, and information indicating the priorities of selection of each component carrier and the threshold value for determination of the receiving quality. The communication control unit 213 writes Usable with respect to the component carriers to actually be used in the Usable/Unusable column of the frequency band information storing unit 241, and writes Unusable with respect to the other component carriers. The communication control unit 213 writes the read-out priority of selection into the frequency band information storing unit 241, and writes the read-out threshold value to the determination threshold value storing unit 244.

At sequence S6, the receiving quality measuring unit 211, based on the received signals from the receiving units 251-1 to 251-3, measures the receiving quality of each of the component carriers A to E. The receiving units 251-1 to 251-3 can receive each of the component carriers simultaneously. The receiving quality measuring unit 211 simultaneously measures the receiving quality of each component carrier used in carrier aggregation. The frequency band selecting unit 212 reads out, from the determination threshold value storing unit 244, the threshold values CC-x-L (x=A to E) for each of the component carriers. The frequency band selecting unit 212 selects, from among the component carriers for each receiving quality that exceeds the threshold value CC-x-L, the component carrier having the highest priority of selection. In the example in FIG. 7, all of the component carriers have a receiving quality that exceeds the threshold value. Because the component carrier A and the component carrier B have the same priority of selection, the frequency band selecting unit 212 selects either of them. For component carriers having the same aggregation level, a component carrier is selected for each mobile terminal device individually, so that the anchor carriers of each of the mobile terminal devices do not concentrate on a particular component carrier. In the example of FIG. 7, the frequency band selecting unit 212 selects the component carrier B.

The mobile terminal device 21 uses this component carrier B as the anchor carrier. Specifically, the frequency band selecting unit 212 writes the component carrier B into a anchor carrier information storing unit 243. In this manner, the mobile terminal device 21 uses, of the component carriers having a receiving quality at least as high as the threshold value CC-x-L, the component carrier having the highest priority of selection as the anchor carrier. In the case in which there is a plurality of component carrier that satisfy the above-noted condition, the mobile terminal device 21 selects a component carrier to be used as the anchor carrier. The mobile terminal device 21, based on the receiving level or randomly, selects the component carrier for use as the anchor carrier.

At the sequence S7, the communication control unit 213 transmits the determined anchor carrier as an anchor carrier change request to the base station apparatus 11, via the transmitting unit 261. This anchor carrier change request is a signal indicating the component carrier B selected by the frequency band selecting unit 212.

In the case in which the receiving units 251-1 to 251-3 are not in a state that enables reception of the component carrier signal to be used as the anchor carrier, the communication control unit 213 sets the receiving units 251-1 to 251-3 to a condition in which reception is enabled.

Figure 8:
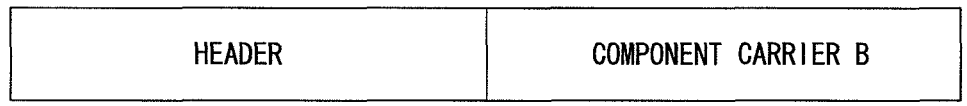
FIG. 8 is a table showing the data constitution of data requesting an anchor carrier change in the first embodiment of the present invention.

FIG. 8 is a table showing the data constitution of an anchor carrier change request. In FIG. 8, the anchor carrier change request includes a header and a component carrier identifier. The header indicates that this signal is an anchor carrier change request. The component carrier identifier is the component carrier identifier for the purpose of specifying the component carrier to be used by the mobile terminal device 21 as the anchor carrier.

Returning to FIG. 7, when the communication control unit 213 transmits an anchor carrier change request via the transmitting unit 261, the receiving unit 161 of the base station apparatus 11 receives the transmitted anchor carrier change request. The control unit 101 writes the component carrier B, which is the anchor carrier newly notified by the anchor carrier change request, into the individual terminal anchor carrier information storage unit 143. The control unit 101 reads out the priority of selection "1" of the component carrier B from the frequency band information storing unit 141. The control unit 101 writes Level 1 into the aggregation information storing unit 142, in accordance with the read-out priority of selection.

At sequence S8, the base station apparatus 11 transmits the anchor carrier change response to the mobile terminal device 21. The base station apparatus 11 transmits the anchor carrier change response on the component carrier B which has been notified as the anchor carrier by the mobile terminal device 21.

At sequence S9, the mobile terminal device 21 that received the anchor carrier change response transitions to the waiting state. In the case in which the anchor carrier change response could not be received, the communication control unit 213 retransmits the anchor carrier change request and waits for the anchor carrier change response. In the case in which the anchor carrier response notification cannot be received even after repeating a prescribed number of times, the mobile terminal device 21 repeats the processing from the position registration. However, because the determination has already been made that the component carrier B is usable as the anchor carrier, the mobile terminal device 21 makes a position registration request using component carrier B. Thereafter, the mobile terminal device 21 receives the position registration response in the same manner as noted above, performs notification of carrier aggregation capability, and receives the carrier aggregation capability response. In this case, because the component carrier B has already been selected, the mobile terminal device 21 transitions to the waiting state after receiving the carrier aggregation capability response, without making an anchor carrier change request.

In the waiting state, the mobile terminal device 21 only starts the anchor carrier. In the case in which the mobile terminal device 21 receives a call, the base station apparatus 11 makes notification by the anchor carrier control information. In the case in which the mobile terminal device 21 performs calling processing, the mobile terminal device 21 connects to the base station apparatus 11 on the uplink corresponding to the anchor carrier. In the example of FIG. 7, the anchor carrier is the component carrier B. For this reason, when a packet communication request occurs by a user operation (sequence S10), the mobile terminal device 21 transmits a packet connection request on the uplink corresponding to the component carrier B (sequence S11). The term packet communication request as used here refers to the condition in which the mobile terminal device 21 has accepted an operation input from a user requesting transmission of data (hereinafter "user data") from the base station apparatus 11 to the mobile terminal device 21, such as when browsing the Internet or the like.

At the sequence S12, when preparation for packet connection has been achieved, the base station apparatus 11 transmits a packet connection response. After transmitting the packet connection response, at sequence S13, the base station apparatus 11 uses the component carriers A to E to perform carrier aggregation and transmit user data. Specifically, the control unit 101 reads out, from the aggregation information storing unit 142, information of the component carriers used in carrier aggregation and information of the aggregation level. The control unit 101 also reads out, from the frequency band information storing unit 141, the priorities of selection of each of the component carriers. Of the component carrier used in carrier aggregation, the transmitting units 151-1 to 151-3 transmit the user data using component carriers having a priority of selection that is no greater than the above-noted aggregation level.

In the example of FIG. 7, the aggregation level information is Level 1. The priorities of selection of the component carriers A to E are all 1 or lower. Therefore, the transmitting units 151-1 to 151-3 of the base station apparatus 11 transmit user data using the component carriers A to E. With regard to the control data used in the control of the communication protocol, the base station apparatus 11 uses the anchor carrier for transmission. The communication control unit 213 of the mobile terminal device 21 reads out, from the frequency band information storing unit 241, the usable component carriers and corresponding priorities of selection, and reads out, from the anchor carrier information storing unit 243, the anchor carrier. The communication control unit 213 controls the receiving units 251-1 to 251-3 so that they receive the user data from component carriers, from among the usable component carriers, that have a priority of selection that is either the same as or lower than that of the anchor carrier. In the example of FIG. 7, the priority of selection of the anchor carrier B is 1 and control is performed so as to receive user data from the component carriers A to E having a priority of selection that is 1 or lower. The anchor carrier B is the component carrier selected by the frequency band selecting unit 212 at sequence S6. Therefore, the communication control unit 213 controls the receiving units 251-1 to 251-3 so as to receive data transmitted using, of the usable component carriers, the component carriers A and B that have the same priority of selection as the component carrier B selected by the frequency band selecting unit 212, and the component carriers C, D, and E, which have a priority of selection that is lower.

The receiving data linking unit 214 links the data received from all the component carriers and demodulated by the receiving units 251-1 to 251-3, so as to reproduce the user data. By doing this, it is possible to perform high-speed data communication. In the case in which the transmission and receiving the user data have been completed and the packet communication is to be disconnected, the communication control unit 213 transmits a packet connection release request via the transmitting unit 261 (sequence S14). The base station apparatus 11 transmits a packet connection release response to the mobile terminal device 21 (sequence S15). Thereafter, the base station apparatus 11 and the mobile terminal device 21 use only the component carrier B to perform transmission and receiving of control data indicating the communication protocol.

Figure 9:
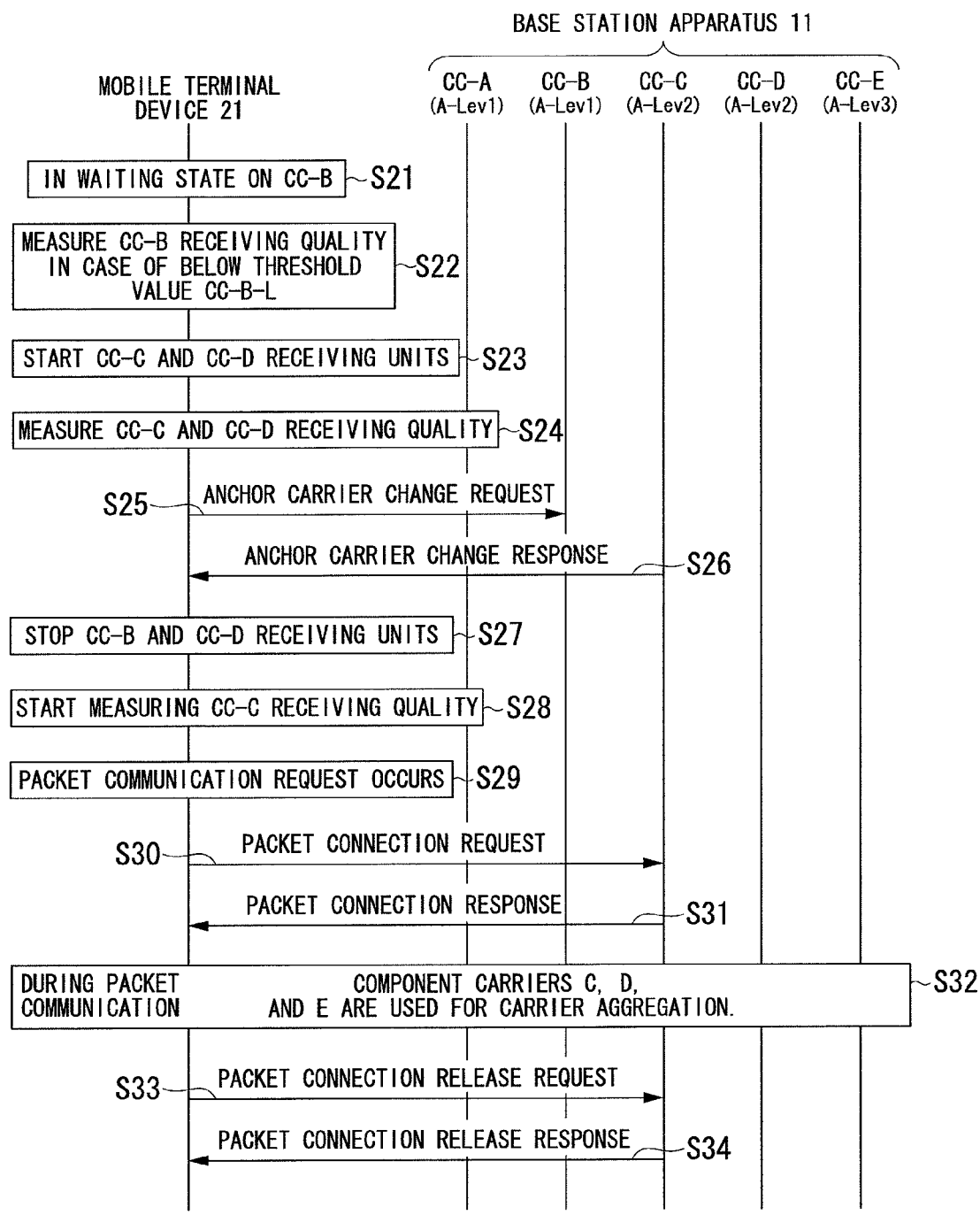
FIG. 9 is a sequence diagram showing an example of the processing protocol for updating the anchor carrier while the mobile terminal device 21 is in the waiting state in the first embodiment of the present invention.

FIG. 9 is a sequence diagram showing the protocol for updating the anchor carrier while the mobile terminal device 21 is in the waiting state.

At sequence S21, the mobile terminal device 21 is in the waiting state on the component carrier B, which is the anchor carrier. At sequence S22, the receiving quality measuring unit 211 periodically measures the receiving quality of the anchor carrier. Because the component carrier B is the component carrier having the largest aggregation level, even if the receiving quality exceeds the threshold value CC-B-H, the aggregation level and the anchor carrier are not changed. For this reason, the frequency band selecting unit 212 does not determine whether or not the threshold value CC-B-H is exceeded. The frequency band selecting unit 212 reads out the threshold value CC-B-L from the determination threshold value storing unit 244, and determines whether or not the receiving quality of the anchor carrier is lower than the threshold value CC-B-L. If the receiving quality is better than the threshold value CC-B-L, the receiving quality measuring unit 211 terminates the measurement of the receiving quality. In the example of FIG. 9, at the starting time of the waiting state (sequence S21), the component carrier B has sufficient receiving quality. In contrast, at sequence S22, the receiving quality of the anchor carrier (component carrier B) transitions to a state which is lower than CC-B-L.

This transition of the receiving quality occurs, for example, with movement of the mobile terminal device 21, or with a change in the propagation conditions between the mobile terminal device 21 and the base station apparatus 11.

At sequence S23, the communication control unit 213 starts the receiving unit 251-2, of the component carriers C and D, which have one lower aggregation level.

At sequence S24, the receiving quality measuring unit 211 measures the receiving quality of the component carriers C and D, using a synchronization signal or reference signal that is transmitted on the component carriers C and D by the base station apparatus 11. In the case in which the receiving quality of the component carrier C measured by the receiving quality measuring unit 211 exceeds the threshold value CC-C-L or the receiving quality of the component carrier D measured by the receiving quality measuring unit 211 exceeds the threshold value CC-C-L, the frequency band selecting unit 212 changes the anchor carrier to either one of these component carriers. In the example of FIG. 9, the frequency band selecting unit 212 selects the component carrier C as the anchor carrier. The frequency band selecting unit 212 writes the carrier name of the component carrier C, which is the anchor carrier after the change, into the anchor carrier information storing unit 243.

At sequence S25, the communication control unit 213 sends an anchor carrier change request to change the anchor carrier to the component carrier C to the base station apparatus 11, using an uplink that corresponds to the component carrier B. In this case, the component carrier B, which is the original anchor carrier, and the component carriers C and D, the receiving quality of which was measured are in a condition enabling receiving of data. Hereinafter, a component carrier X that is the anchor carrier will sometimes be referred to as the anchor carrier X.

At sequence S26, the base station apparatus 11 that received the anchor carrier change request writes the component carrier C, which is the anchor carrier after the change, into the individual terminal anchor carrier information storing unit 143. The base station apparatus 11 reads out from the frequency band information storing unit 141 the aggregation level of the component carrier C. The base station apparatus 11 writes Level 2, which is the read-out aggregation level, into the aggregation information storing unit 142. When this processing is completed, the base station apparatus 11 transmits an anchor carrier change response, using the component carrier C, which is the new anchor carrier. The mobile terminal device 21 receives the anchor carrier change response on the component carrier C.

At sequence S27, the communication control unit 213 of the mobile terminal device 21 that received the anchor carrier change response stops receiving on carriers other than the anchor carrier, these being the component carriers B and D. Then, the communication control unit 213 waits for reception on the component carrier C, and performs receiving of control data from the base station apparatus 11.

At sequence S28, the receiving quality measuring unit 211 starts periodically measuring the receiving quality of the anchor carrier C. Because the aggregation level of the component carrier C is Level 2, the frequency band selecting unit 212 compares the measured receiving quality with both of the threshold values, CC-C-H and CC-C-L. If the receiving quality is lower than the threshold value CC-C-H and higher than the threshold value CC-C-L, the mobile terminal device 21 continues using the component carrier C as the anchor carrier.

The communication control unit 213 of a mobile terminal device 21 at which a user operation has caused a packet communication request at sequence S29 transmits a packet connection request to the base station apparatus 11 at sequence S30. At sequence S31, the base station apparatus 11 which has become ready for a packet connection transmits a packet connection response to the mobile terminal device 21.

When the packet connection response is received from the base station apparatus 11, the communication control unit 213 starts the receiving units 251-2 to 251-3 so that receiving is possible on a component carrier having an aggregation level no greater than Level 2. At sequence S32, the base station apparatus 11 and the mobile terminal device 21, similar to sequence S13 in FIG. 7, use carrier aggregation to transmit user data, using the component carriers C, D, and E. The base station apparatus 11 transmits the user data on component carriers having no greater than Level 2. The mobile terminal device 21 receives and demodulates the user data transmitted by the base station apparatus 11. By doing this, it is possible to perform high-speed data transfer. At sequence S33, when the packet communication ends, the communication control unit 213 transmits a packet connection release request on the anchor carrier C. Upon receiving the packet connection release request, the base station apparatus 11 terminates packet receiving, and transmits a packet connection release response to the mobile terminal device at sequence S33 (sequence S34). By the above-noted processing, the packet communication is completed, and the mobile terminal device 21 goes into the waiting state again.

Figure 10:
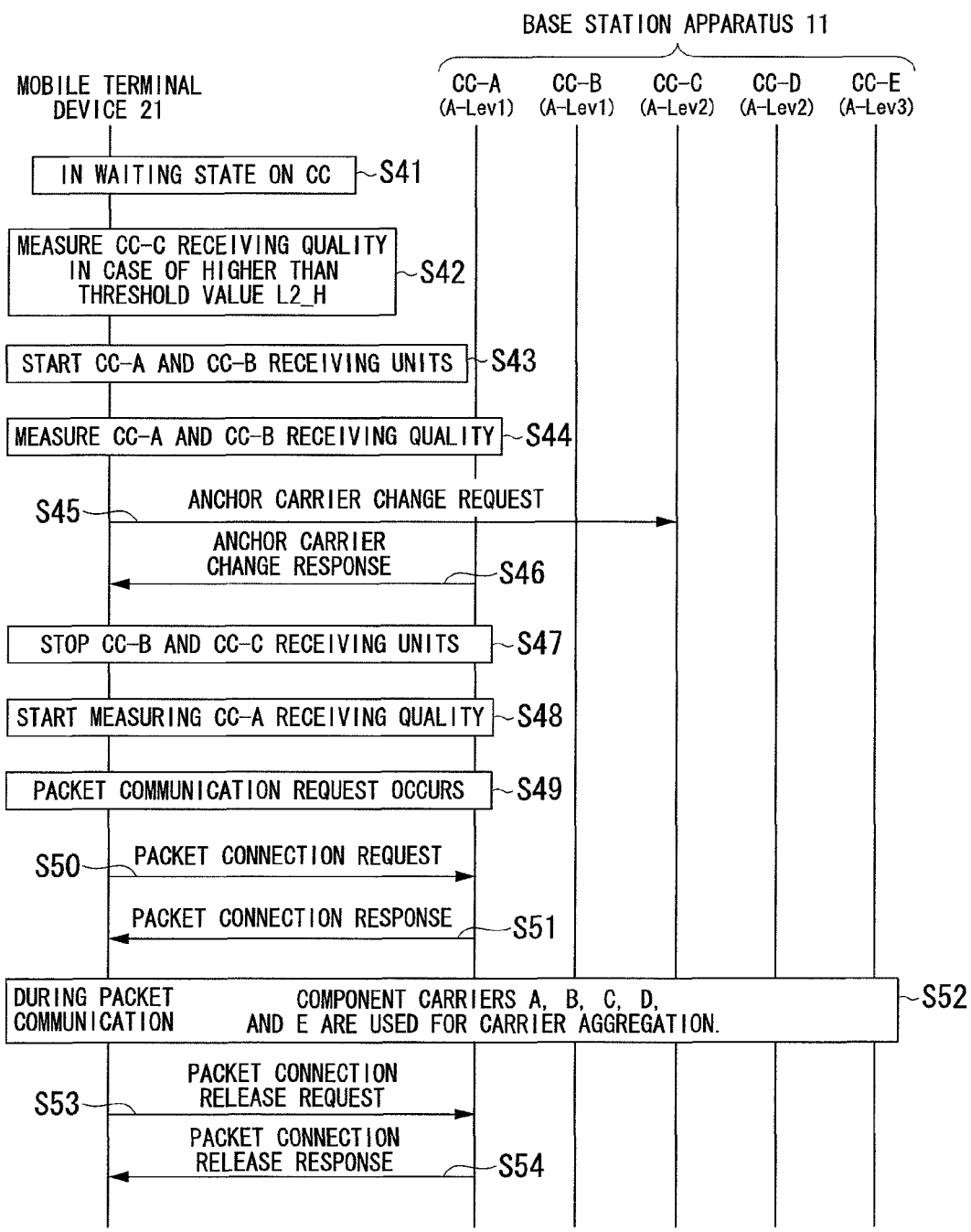
FIG. 10 is a sequence diagram showing an example of the processing protocol whereby the mobile terminal device 21 changes the anchor carrier to a component carrier having a high priority of selection in the first embodiment of the present invention.

FIG. 10 is a sequence diagram showing an example of the processing protocol performed for the mobile terminal device 21 changing the anchor carrier to a component carrier having a high priority of selection. As described above, while in the component carrier waiting state (sequence S41), the receiving quality measuring unit 211 periodically measures (sequence S42) the receiving quality of anchor carrier (for example, the component carrier C). The frequency band selecting unit 212 compares the receiving quality with the threshold value read out from the determination threshold value storing unit 244. In the example of FIG. 10, the receiving quality measuring unit 211 measures the receiving quality of the component carrier C. The frequency band selecting unit 212 determines whether or not the receiving quality exceeds the threshold value CC-C-H and whether or not the receiving quality is below the threshold value CC-C-L. In the case in which the receiving quality is higher than the threshold value CC-C-L and also lower than the threshold value CC-C-H, the receiving quality measuring unit 211 thereafter continues to measure the receiving quality periodically, without the frequency band selecting unit 212 changing the anchor carrier. The mobile terminal device 21 measures the receiving quality of the anchor carrier at a pre-established interval. The mobile terminal device 21 may have a function of measuring the speed of motion of itself as a mobile terminal device and may make the measuring interval long in the case in which its speed of movement is slow and may make the measuring interval short in the case in which its speed of movement is fast. In the case in which the speed of movement of the mobile terminal device 21 is fast, the receiving quality tends to change more than the case in which the speed of movement is slow, because the change in distance from the base station apparatus is great. In this case, by shortening the measuring interval, it is possible to measure at a more appropriate interval.

The mobile terminal device 21 may be made to change the measuring interval in accordance with an instruction from the base station apparatus 11. For example, the base station apparatus 11 stores beforehand a measuring interval that is in accordance with the environment in which it is installed, and transmits that measuring interval to the mobile terminal device 21 as broadcast information or as individual wireless protocol control data. Upon receiving the measuring interval transmitted from the base station apparatus 11, the mobile terminal device 21 measures the receiving quality in accordance with the received measuring interval. By doing this, the mobile terminal device 21 can measure the receiving quality with an interval that is appropriately set in accordance with the installation environment of the base station apparatus 11.

The base station apparatus 11 may be made to change the receiving quality measuring interval in accordance with the wireless protocol control status. For example, in the case in which the receiving quality for all of the component carriers as reported from the mobile terminal device 21 is good, the base station apparatus 11 sets the measuring interval to longer than the prescribed value, and in other cases sets the measuring interval to shorter than the prescribed value. By doing this, the mobile terminal device 21 can measure the receiving quality with a measuring interval that is appropriately set in accordance with the installation environment of the base station apparatus 11.

Also, when the receiving quality changes, the base station apparatus 11 may be enabled to measure the receiving quality early by making the measuring interval shorter than the prescribed measuring interval during a period in which the number of users accommodated by the base station apparatus is small. When the number of accommodated users of the local base station apparatus increases over a prescribed number, by making the measurement period longer, the wireless protocol overhead may be reduced.

In addition, when the measurement period is changed, the base station apparatus 11 transmits to the mobile terminal devices by using control information of each of the mobile terminal devices. Alternatively, the base station apparatus 11 changes the value of the broadcast information, and transmits a change of the measuring interval to the mobile terminal devices by paging.

As a result of measuring the receiving quality of the component carrier C, if the threshold value F2-H (that is, CC-C-H) is exceeded, the frequency band selecting unit 212 determines whether or not the anchor carrier can be changed. The communication control unit 213 reads out the aggregation level from the frequency band information storing unit 241. Then, the communication control unit 213 starts the receiving unit 251-1 of the component carriers A and B, which have one higher aggregation level (sequence S43). The receiving quality measuring unit 211 measures the respective receiving quality of each of the component carriers A and B (sequence S44) and determines whether or not the receiving quality exceeds the threshold value F1-L (that is, CC-A-L=CC-B-L) of a Level 1 component carrier. If this threshold value F1-L is not exceeded, the mobile terminal device 21 stops the receiving unit 251-1 of the component carriers A and B, and continues to measure the receiving quality on the anchor carrier component carrier C.

If the threshold value CC-A-L is exceeded, the frequency band selecting unit 212 performs processing to change the anchor carrier. In the example of FIG. 10, a transition is made to the state in which the receiving quality exceeds the threshold value CC-A-L during the waiting state. In this case, the frequency band selecting units 212 inputs an anchor carrier change request to the communication control unit 213. At step S45, the communication control unit 213 transmits the anchor carrier change request to the base station apparatus 11, via the transmitting unit 261.

At sequence S46, the base station apparatus 11 that received the anchor carrier change request reads out from the received anchor carrier change request the component carrier that is the anchor carrier after the change. The base station apparatus 11 writes the read-out component carrier anchor carrier into the individual terminal anchor carrier information storing unit 143, in association with the IMSI of the mobile terminal device 21. The base station apparatus 11 transmits an anchor carrier change response to the mobile terminal device 21 on the anchor carrier after the change.

At sequence S47, the control unit 201 of the mobile terminal device 21 that received the anchor carrier change response writes into the anchor carrier information storing unit 243 the component carrier A, which is the anchor carrier after the change. The control unit 201 changes the anchor carrier from the component carrier C to the component carrier A. The communication control unit 213 of the mobile terminal device 21 stops receiving processing of the component carriers B and C. Thereafter, the mobile terminal device 21 waits on the component carrier A. At sequence S48, the mobile terminal device 21 starts periodically measuring the receiving quality of component carrier A. In the case in which a packet communication request occurs at the mobile terminal device 21 (sequence S49) and communication is performed with the base station apparatus 11 (sequences S50 to S54), similar to sequences S11 to S15 of FIG. 7, the base station apparatus 11 and the mobile terminal device 21 communicate with a component carrier having an aggregation level of Level 1 or lower. By doing this, it is possible to use more frequency spectrum in transmitting data.

Figure 11:
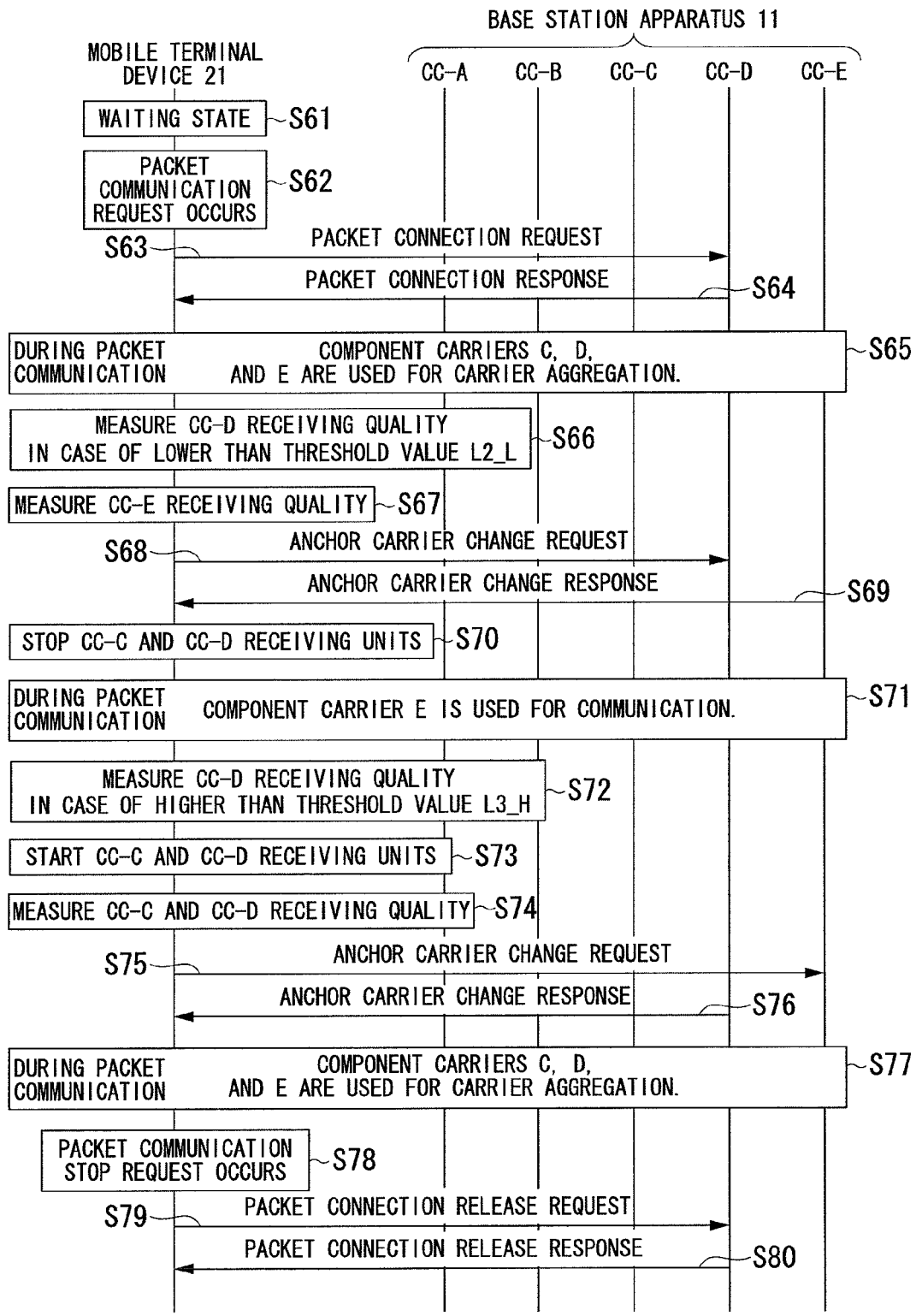
FIG. 11 is a sequence diagram showing an example of the processing protocol whereby the mobile terminal device 21 changes the anchor carrier during communication in the first embodiment of the present invention.

FIG. 11 is a sequence diagram showing an example of the processing protocol for changing the anchor carrier while the mobile terminal device 21 is communicating. Although not illustrated in FIG. 7 to FIG. 10, the mobile terminal device 21 performs determination processing of the anchor carrier even during communication. When a packet communication request occurs, communication starts by carrier aggregation in accordance with the anchor carrier at that time.

At sequence S61, the mobile terminal device 21 makes the component carrier D, which has an aggregation level of Level 2, the anchor carrier.

When a packet communication request occurs at the mobile terminal device 21 by a user operation at sequence S62, the communication control unit 213 transmits a packet connection request to the base station apparatus 11 at sequence S63.

At sequence S64, the base station apparatus 11 prepares for packet connection, and transmits a packet connection response after preparation for the packet connection is completed.

At sequence S65, the mobile terminal device 21 and the base station apparatus 11 start communicating by carrier aggregation, similar to sequence S13 in FIG. 7. In this case, because the anchor carrier of the mobile terminal device 21 is D, the aggregation level is Level 2, and communication starts by carrier aggregation using component carriers C, D, and E, which have an aggregation level no greater than Level 2. Even during packet communication, the receiving quality measuring unit 211 periodically measures the anchor carrier receiving quality.

At sequence S66, in the case in which the receiving quality of the anchor carrier D is lower than the threshold value CC-D-L, the receiving quality measuring unit 211 measures the receiving quality of the component carrier E that has an aggregation level of Level 3.

At sequence S67, the frequency band selecting unit 212 determines whether or not the receiving quality of the component carrier E exceeds the threshold value CC-E-L. In the case in which the receiving quality exceeds the threshold, the frequency band selecting unit 212 changes the anchor carrier to the component carrier E. If the receiving quality of the component carrier E is lower than CC-E-L, the receiving quality measuring unit 211 measures the receiving quality of a component carrier having a lower aggregation level, and the frequency band selecting unit 212 selects the anchor carrier.

However, because there is no component carrier having a lower receiving quality than Level 3 in the example of FIG. 11, even if the receiving quality is lower than CC-E-L, the frequency band selecting unit 212 changes the anchor carrier to the component carrier E. If the receiving quality is low even for the component carrier E, if there is a base station apparatus that receive better than the base station apparatus 11, the mobile terminal device 21 makes a cell handoff to that base station apparatus. In the example of FIG. 11, because the receiving quality of the component carrier E is better than CC-E-L, the frequency band selecting unit 212 performs processing to change the anchor carrier.

At sequence S68, the communication control unit 213 transmits an anchor carrier change request on anchor carrier D, via the transmitting unit 261.

At sequence S69, the base station apparatus 11 that received the anchor carrier change request prepares for the anchor carrier change, and transmits an anchor carrier change response to the mobile terminal device 21. The base station apparatus 11 includes in the anchor carrier change response timing information for performing the change and transmits the anchor carrier change response. The timing information indicates the timing after receiving specific data, and the base station apparatus 11 and the mobile terminal device 21 change the anchor carrier immediately after the transmission and receiving of that data. Upon receiving the anchor carrier change response, the communication control unit 213 verifies the execution timing, up until which point carrier aggregation is continued with the current component carriers. The specified timing is notified by a frame number or the like. When the specified frame number is reached, the communication control unit 213 changes to operation using the new anchor carrier. The only component carrier having an aggregation level of Level 3 or lower is the component carrier E. For this reason, the communication control unit 213 communicates with only the component carrier E. When the specified frame timing has past, the communication control unit 213 stops the receiving unit 251-2 of the component carriers C and D (sequence S70). Thereafter, the mobile terminal device 21 communicates with the base station apparatus 11 on component carrier E (sequence S71), and periodically checks the receiving quality of component carrier E. The mobile terminal device 21 measures the receiving quality of the component carrier D (sequence S72). In the case in which the receiving quality of the component carrier D exceeds the threshold value L3-H, the receiving unit 251-2, whose aggregation level changing to Level 2, of the component carriers C and D is started (sequence S73), and the receiving quality of the component carriers C and D is measured (sequence S74).

At sequence S75, in the case in which the measured receiving quality exceeds the threshold value read out from the determination threshold value storing unit 244, the communication control unit 213 transmits an anchor carrier change request to the base station apparatus 11 via the transmitting unit 216. Then, at sequence S76 the mobile terminal device 21 receives an anchor carrier change response. When the timing specified by the anchor carrier change response is reached, the communication control unit 213 performs carrier aggregation communication in accordance with the new anchor carrier, using the component carriers C, D, and E (sequence S77). In FIG. 11, the mobile terminal device 21 uses the component carriers C, D, and E to perform carrier aggregation communication with the base station apparatus 11.

In the case in which a packet communication stop request occurs, the mobile terminal device 21 transmits a packet connection release request to the base station apparatus 11 on the component carrier D, in response to which the base station apparatus 11 on component carrier D transmits a packet connection release response to the mobile terminal device 21 (sequence S80).

By the above-described processing, even if communication is in progress, it is possible to select an appropriate component carrier and perform carrier aggregation. Also, because operation on a component carrier in a poor receiving condition is stopped, it is possible to reduce power consumption.

In this manner, the mobile terminal device 21 transmits one component carrier identifier to the base station apparatus 11. The base station apparatus 11 determines the component carriers for performing carrier aggregation in accordance with this component carrier identifier and the priority of selection. For this reason, it is possible, for example, to determine the component carriers for performing carrier aggregation with a smaller amount of communication than the case of communicating the receiving quality of all component carriers.

The base station apparatus 11 may be made to set the priority of selection for each mobile terminal device individually. For example, the mobile terminal device 21 can have a position detecting unit, and send its current position to the base station apparatus 11. The base station apparatus 11 would store the priority of selection in accordance with the position of the mobile terminal device in the frequency band information storing unit 141 beforehand. The control unit 101 would then read out from the frequency band information storing unit 141 the priority of selection in accordance to the current position of the mobile terminal device 21, so as to determine the priority of selection to be used between it and the mobile terminal device 21. Transmitting units 151-$i$ ($i$=1 to 3) of the base station apparatus 11 would then transmit a signal indicating the determined priority of selection to the mobile terminal device 21. Upon receiving of these signals by the receiving units 251-$i$ ($i$=1 to 3) of the mobile terminal device 21, the communication control unit 213 reads out the priority of selection from the received signals, and writes it into the frequency band information storing unit 241. At sequence S6 in FIG. 7, the frequency band selecting unit 212 reads out this priority of selection from the frequency band information storing unit 241. The frequency band selecting unit 212 then selects, from among the component carriers having a receiving quality that is at least the threshold value, the component carrier having the highest priority of selection.

By doing this, in the case, for example, in which the mobile terminal device 21 is located in a position at which a specific component carrier is susceptible to noise, the priority of selection of that component carrier is made high. By doing this, it is possible to select component carriers for carrier aggregation using more appropriate priorities of selection.

The mobile terminal device 21 may be made to use a threshold values between when in the waiting state and when communicating. Also, the mobile terminal device 21 may be made to measure the channel quality information as the receiving quality during communication. For example, in the case in which the precision of frequency synchronization with the base station apparatus 11 is lower during the waiting state of the mobile terminal device 21 than during communication, the receiving quality during the waiting state would be detected as being lower. In such a case, by changing the method of measuring the threshold or the receiving quality between when the mobile terminal device 21 is communicating and when it is in the waiting state, it is possible to perform a determination in accordance with the state of the mobile terminal device 21.

The wireless communication system 1 (FIG. 1) according to the first embodiment has mobile terminal devices 21 to 23 (FIG. 2) and a base station apparatus 11 (FIG. 4).

The mobile terminal devices 21 to 23 (FIG. 2) have receiving units 271-1 to 271-3, a frequency band information storing unit 241, an anchor carrier information storing unit 243, a transmitting unit 261, and a communication control unit 213.

The receiving units 271-1 to 271-3 receive wireless signals on a plurality of frequency bands among the base station apparatus 11.

The frequency band information storing unit 241 stores the priorities of selection of the frequency bands.

The anchor carrier information storing unit 243 stores information that indicates frequency bands that have a receiving quality that is at least a threshold value indicating the lowest receiving quality level and also has the highest priority of selection.

The transmitting unit 261 transmits to the base station apparatus 11 information stored in the anchor carrier information storing unit 243.

The communication control unit 213 controls the receiving units 271-1 to 271-3 so that they receive data transmitted using the frequency band of the information stored in the anchor carrier information storing unit 243 and the frequency band having a priority of selection that is lower than the frequency band of information stored in the anchor carrier information storing unit 243.

The base station apparatus 11 (FIG. 4) has a receiving unit 161 and transmitting units 151-1 to 151-3.

The receiving unit 161 receives the information transmitted by the mobile terminal devices 21 to 23.

The transmitting units 151-1 to 151-3, based on information received by the receiving unit 161, transmit data in parallel to the mobile terminal devices 21 to 23, using the frequency band having the highest priority of selection and a frequency band having a priority of selection lower than that of the frequency band having the highest priority of selection.

In the wireless communication system 1 according to the first embodiment, the threshold value may differ depending upon the frequency band.

In the wireless communication system 1 according to the first embodiment, the priority of selection may be made lower, the better is the expected receiving quality for the frequency band.

In the wireless communication system 1 according to the first embodiment, the priority of selection may be made lower, the lower is the center frequency of a frequency band.

In the wireless communication system 1 according to the first embodiment, when good receiving quality cannot be expected even on a frequency band having a low center frequency, the priority of selection may be made higher than another frequency band having a high center frequency.

In the wireless communication system 1 according to the first embodiment, the transmitting units 151-1 to 151-3 of the base station apparatus 11 may be made to use the frequency band having the highest priority of selection as an anchor carrier to send to anchor carrier control information of a plurality of frequency bands together at once.

In the wireless communication system 1 according to the first embodiment, the transmitting units 151-1 to 151-3 of the base station apparatus 11 may be made to use the frequency band having the lowest priority of selection as an anchor carrier to send to anchor carrier control information of a plurality of frequency bands together at once.

In the wireless communication system 1 according to the first embodiment, in the case in which the frequency band having the highest priority of selection has a receiving quality that is above the threshold value indicating that the receiving quality is good, the communication control units 213 of the mobile terminal devices 21 to 23, may be made to change the frequency band having a higher priority of selection to a frequency band having the highest priority of selection.

In the wireless communication system 1 according to the first embodiment, the transmitting units 171-1 to 171-3 of the base station apparatus 11 may be made to transmit a common notification signal to the mobile terminal devices 21 to 23 into which it includes the priority of selection.

In the wireless communication system 1 according to the first embodiment, the priority of selection may be such that one and the same priority is assigned to a plurality of frequency bands.

Using the wireless communication system 1 according to the first embodiment, it is possible to determine, using a smaller amount of communication, the component carriers used in performing carrier aggregation.

Second Embodiment

Figure 12:
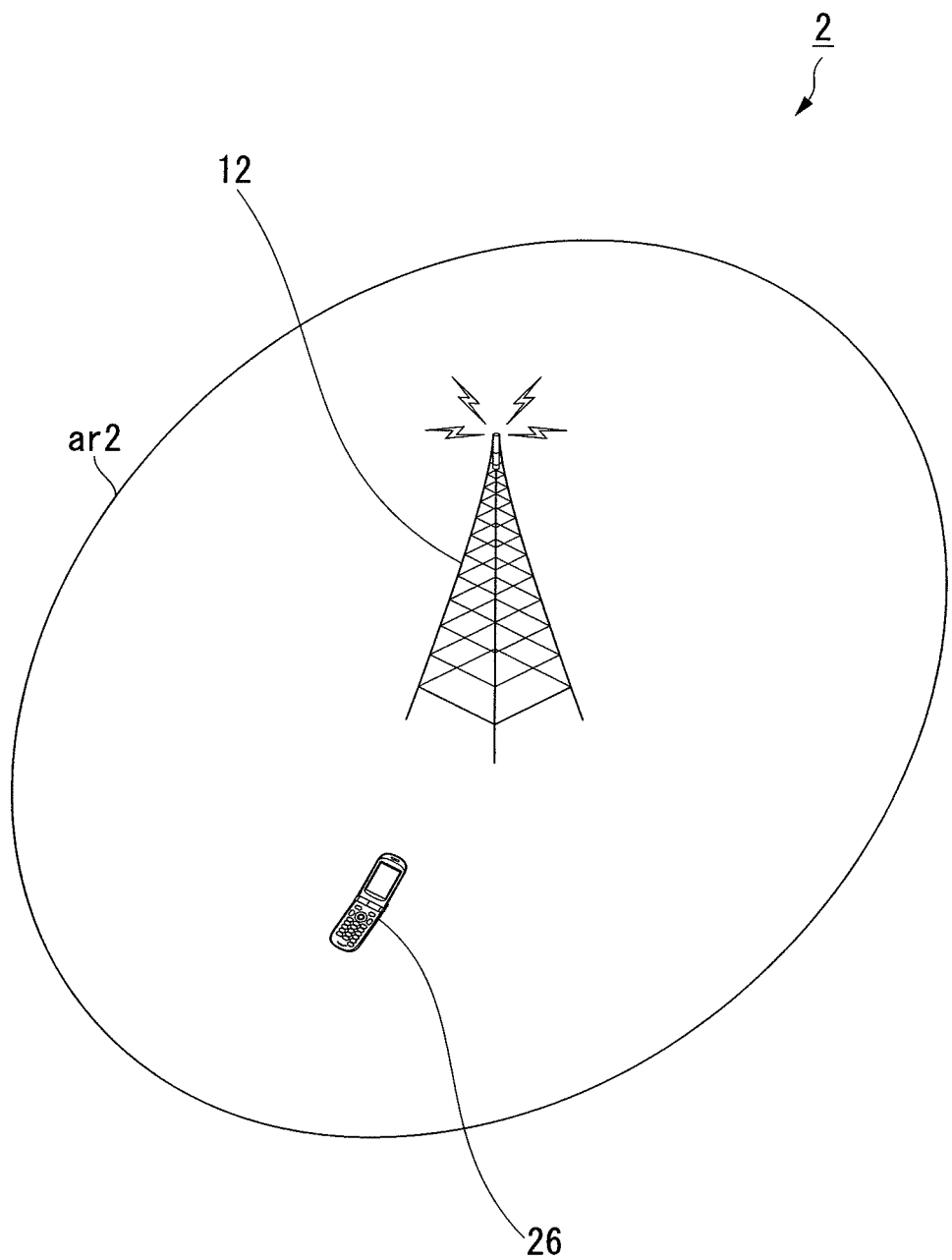
FIG. 12 is a drawing showing the general system constitution of a wireless communication system 2 in a second embodiment of the present invention.

FIG. 12 is a drawing showing the general constitution of a wireless communication system 2 in a second embodiment of the present invention. In FIG. 12, the wireless communication system 2 includes a base station apparatus 12 and a mobile terminal device 26. Because each is similar to the base station apparatus 11 of FIG. 2 and the mobile terminal device 21 of FIG. 4, respectively, they are not illustrated or described herein. However, the transmitting power when the base station apparatus 12 performs wireless transmission of a signal is different than that of the base station apparatus 11. The transmitting power in the base station apparatus 12 will be described later. In the mobile terminal device 26, the threshold value for determining the receiving quality is different than in the mobile terminal device 21. Whereas the mobile terminal device 21 may use a threshold value that is common to all the component carriers, the mobile terminal device 26 uses a threshold value that differs for each frequency band, as will be described later.

In contrast to the base station apparatus 11 of the first embodiment, in order to be able to achieve accommodating capability by installing a large number of base station apparatuses, in a location in which a large number of portable telephones are used, such as in an urban area, the service area of the base station apparatus is made small. For this reason, the base station apparatus, rather than performing transmission of each component carrier used in carrier aggregation with the maximum transmitting power, adjusts the transmitting power so as to cover the overall service area and also so that there is no interference with another base station apparatus. For this reason, the service areas of each of the component carriers A to E are all of the same size, as indicated by the area ar21 in FIG. 12.

Figure 13:
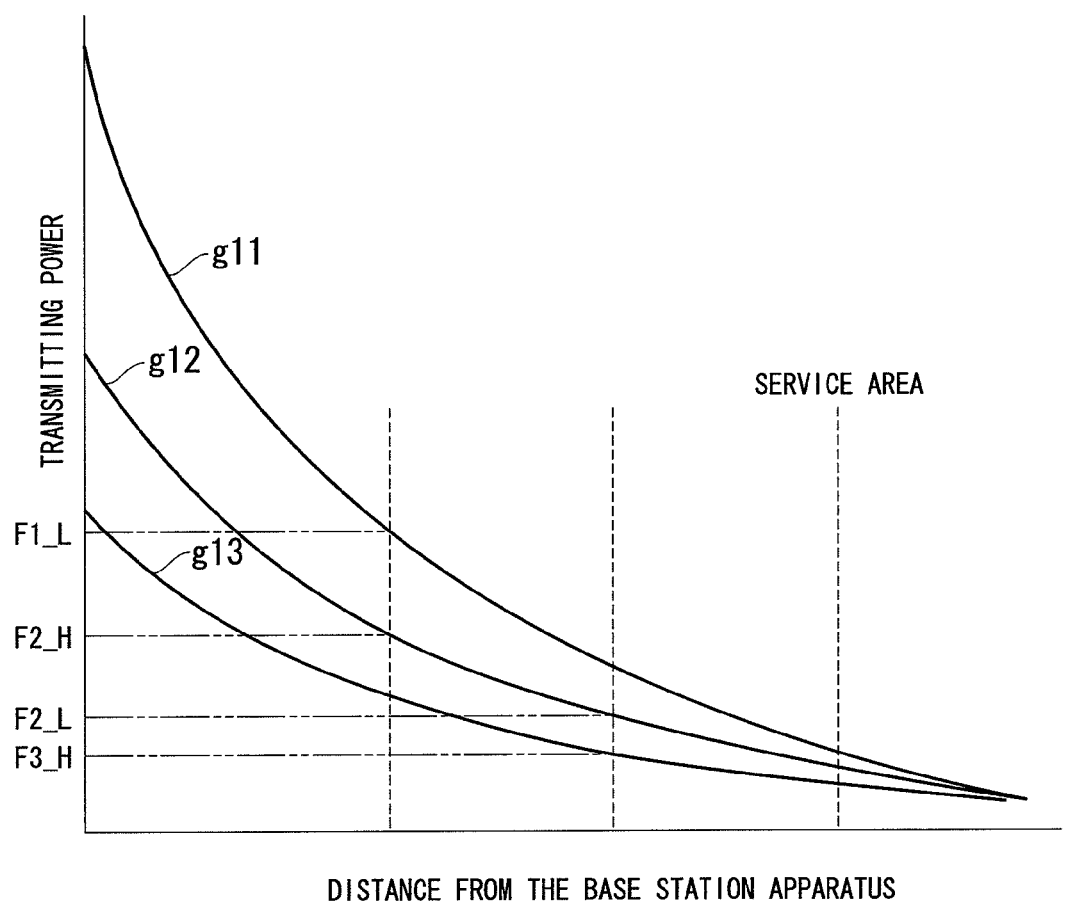
FIG. 13 is a graph showing the condition of the transmitting powers for each of the component carriers of the base station apparatus 12 in the second embodiment of the present invention.

FIG. 13 is a graph showing the condition of the transmitting power for each of the component carriers of the base station apparatus 12. In FIG. 13, the horizontal axis represents the distance of the mobile terminal device 26 from the base station apparatus 12, and the vertical axis represents the transmitting power of a signal transmitted from the base station apparatus 12 to the mobile terminal device 26. The base station apparatus 12 communicates in the frequency band F1 on the two component carriers A and B, these two frequency bands being mutually adjacent. The characteristics in the case in which the base station apparatus 12 communicates on the component carrier A and the component carrier B are shown by the curve g11 in FIG. 13. In the same manner, the base station apparatus 12 communicates in the frequency band F2 on the component carrier C and the component carrier D. The characteristics in the case in which the base station apparatus 12 communicates on the component carrier C and the component carrier D are shown by the curve g12 in FIG. 13. Additionally, the base station apparatus 12 communicates in the frequency band F3 on the component carrier E. The characteristics in the case in which the base station apparatus 12 communicates on the component carrier E are shown by the curve g13 in FIG. 13. The frequency relationship is F1>F2>F3. The frequency band F1, being the highest frequency, has a large attenuation with distance. For this reason, in order to cover the service area, a high transmitting power is necessary, compared with the other frequency bands. Below that, because the attenuation with distance becomes small as the frequency decreases, the base station apparatus 12 can cover the service area with a smaller transmitting power, so that there is no interference with an adjacent base station apparatus. An urban area, however, has many buildings, houses and the like. For this reason, in the case of use in a house, for example, because of the influence of diffraction and reflection, a low frequency tends to have a better receiving quality than a high frequency. For this reason, the base station apparatus 12 sets the threshold value higher, the higher is the frequency of the frequency band. By doing this, in the case in which the mobile terminal device 26 is at a distance from the base station apparatus 12, an early switch to made to a component carrier having a low frequency.

In the second embodiment as well, similar to the first embodiment, it is expected that the receiving quality is better, the lower is the frequency. Given this, the priority of selection is set lower, the lower is the frequency.

Figure 14:
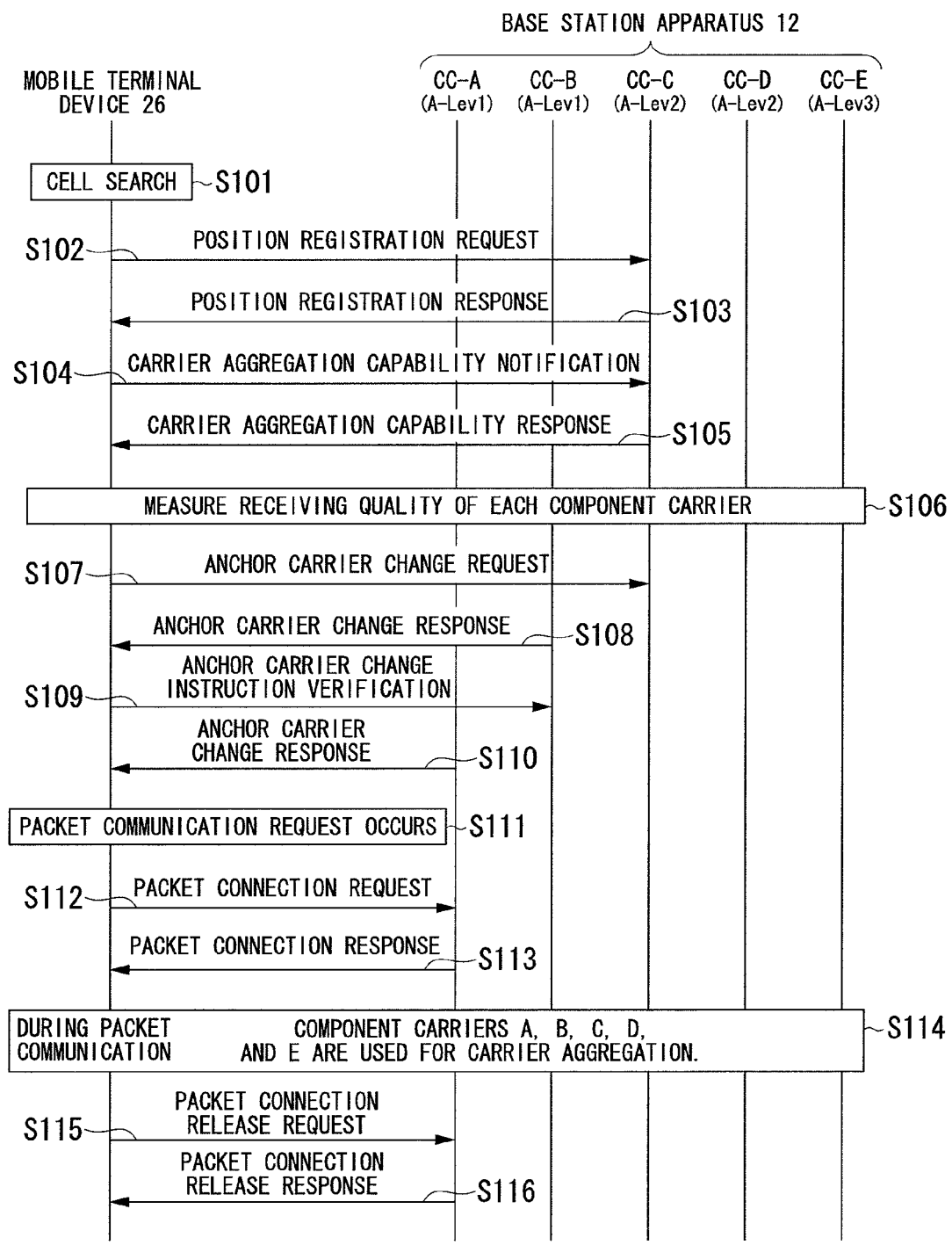
FIG. 14 is a sequence diagram showing an example of the processing protocol when a mobile terminal device 26 starts and communicates with the base station apparatus 12 in the second embodiment of the present invention.

FIG. 14 is a sequence diagram showing an example of the processing protocol whereby the mobile terminal device 26 starts and communicates with the base station apparatus 12. This operation is similar to the case of the first embodiment. However, in an urban area there are cases in which the number of terminals accommodated by a base station apparatus is large, in which case the anchor carriers of the mobile terminal devices may concentrate on a specific component carrier. In such cases, the base station apparatus 12 changes the anchor carriers so as to distribute the resources of the wireless protocol.

Sequences S101 to S105 in FIG. 14 are the same as sequences S1 to S5 in FIG. 7.

At sequence S106, the receiving quality measuring unit 211 measures the receiving quality of each of the component carriers A to E. Then, if a change in anchor carrier is necessary, the communication control unit 213 transmits an anchor carrier change request via the transmitting unit 216. In the example of FIG. 14, at sequence S107 the communication control unit 213 transmits the anchor carrier change request via the transmitting unit 216. The anchor carrier change request and the associated conditions are similar to those in the first embodiment.

At sequence S108, the base station apparatus 12, upon receiving the change request, transmits an anchor carrier change response on the component carrier specified by the mobile terminal device 26. When this is done, if an anchor carrier change instruction from the base station apparatus 12 is necessary, it is included in the anchor carrier change response.

At sequence S109, when the mobile terminal device 26 receives the anchor carrier change response, the mobile terminal device 26 verifies whether an anchor carrier change instruction is included in the anchor carrier change response. In this case, the communication control unit 213 prepares for data reception on the instructed component carrier. The communication control unit 213 transmits an anchor carrier change instruction verification message at sequence S109. By receiving this message, the base station apparatus 12 verifies that the mobile terminal device 26 has completed preparation. At sequence S110, the base station apparatus 12 transmits an anchor carrier change response on the new anchor carrier. The mobile terminal device 26, by receiving this message, verifies that the transition of the anchor carrier has been properly completed. At sequences S111 to S116, the base station apparatus 12 and the mobile terminal device 26 communicate user data by carrier aggregation, in the same manner as at S10 to S15 in FIG. 7.

In the case in which there is no anchor carrier change at the mobile terminal device 26 side, the base station apparatus 12 may be made to instruct the anchor carrier change at an arbitrary time. In this case, the base station apparatus 12 transmits an anchor carrier change instruction on the anchor carrier, information regarding the new anchor carrier being included therewithin. When preparation for the reception on the new anchor carrier, which is the instructed component carrier, has been completed, the communication control unit 213 transmits an anchor carrier change instruction response to the base station apparatus 12. When the base station apparatus 12 receives the anchor carrier change instruction response, the base station apparatus 12 transmits an anchor carrier change verification message. By receiving this message, the mobile terminal device 26 verifies that the transition of the anchor carrier has been properly completed.

In the second embodiment as well, similar to the first embodiment, the mobile terminal device 26 transmits one component carrier identifier to the base station apparatus 12. The base station apparatus 12 then determines the component carriers for carrier aggregation, in accordance with this component carrier identifier and the priority of selection. For this reason, it is possible to determine the component carriers for performing carrier aggregation with a smaller amount of communication than in the case, for example, of communicating the receiving quality of all component carriers.

Third Embodiment

Figure 15:
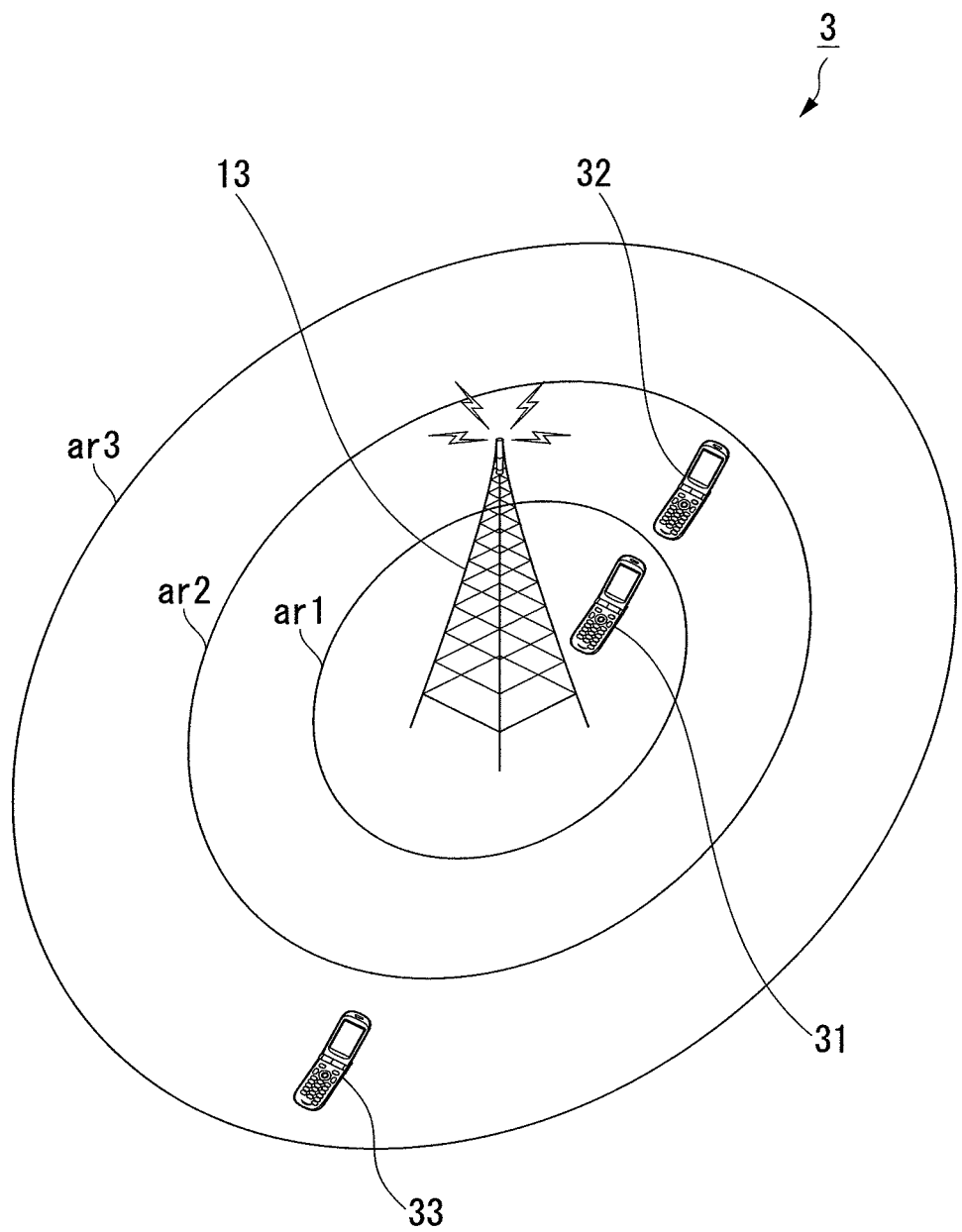
FIG. 15 is a drawing showing the general constitution of a wireless communication system 3 in a third embodiment of the present invention.

FIG. 15 is a drawing showing the general constitution of a wireless communication system 3 in the third embodiment. In FIG. 15, the wireless communication system 3 includes a base station apparatus 13 and mobile terminal devices 31 to 33. The mobile terminal devices 31 to 33 control the anchor carrier and the component carriers used for carrier aggregation separately. The mobile terminal devices 31 to 33 use one pre-established component carrier as the anchor carrier. Specifically, the mobile terminal devices 31 to 33 use the component carrier E, which has the lowest priority of selection, as the anchor carrier. The base station apparatus 13 transmits control information to the mobile terminal devices 31 to 33 on only the one component carrier E. The mobile terminal devices 31 to 33, by updating the aggregation level, change the component carriers used for carrier aggregation. Because the constitution and the operation of the mobile terminal device 32 and the mobile terminal device 33 are the same as the mobile terminal device 31, they are not described herein.

Figure 16:
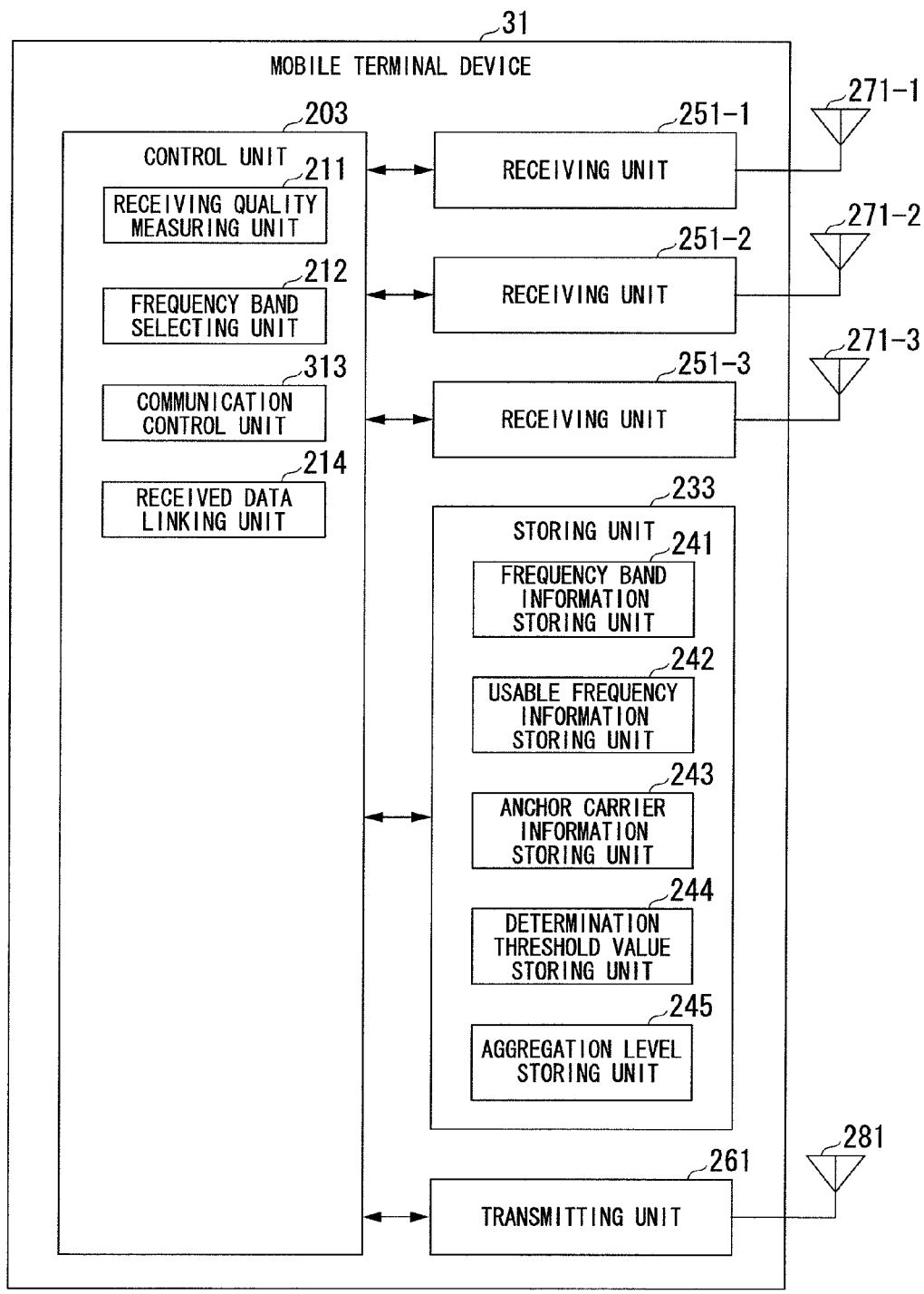
FIG. 16 is a functional block diagram showing the general constitution a mobile terminal device 31 in the third embodiment of the present invention.

FIG. 16 is a functional block diagram showing the general constitution of the mobile terminal device 31.

In FIG. 16, the mobile terminal device 31 includes a control unit 203, a storing unit 233, receiving units 251-1 to 251-3 (first receiving units), a transmitting unit 261 (first transmitting unit), antennas 271-1 to 271-3, and an antenna 281. The control unit 203 includes a receiving quality measuring unit 211, a frequency band selecting unit 212, a communication control unit 313, and a received data linking unit 214. The storing unit 233 includes a frequency band information storing unit 241 (first information storing unit), a usable frequency information storing unit 242, an anchor carrier information storing unit 243, a determination threshold value storing unit 244, and an aggregation level storing unit 245. The anchor carrier information storing unit 243 or the aggregation level storing unit 245 are also referred to as the second information storing unit.

In FIG. 16, parts that are the same as in the mobile terminal device 21 of FIG. 2 are assigned the same reference numerals (211, 212, 214, 241 to 244, 251-1 to 251-3, 261, 271-1 to 271-3, and 281) and are not described herein.

The aggregation level storing unit 245 stores, of the aggregation levels of component carriers used by the local mobile terminal device 31 in carrier aggregation, the highest aggregation level (hereinafter also referred to as an aggregation level of the local mobile terminal device 31).

The communication control unit 313 separately controls the anchor carrier and the component carriers to be aggregated. The communication control unit 313, of the usable component carriers, makes the component carrier having the lowest priority of selection the anchor carrier, and transmits an anchor carrier change request via the transmitting unit 261. The communication control unit 313, separately from the anchor carrier change request, transmits an aggregation level report. The communication control unit 313 transmits the aggregation level report in accordance with the aggregation level determined by the frequency band selecting unit 212 via the transmitting unit 261.

Figure 17:
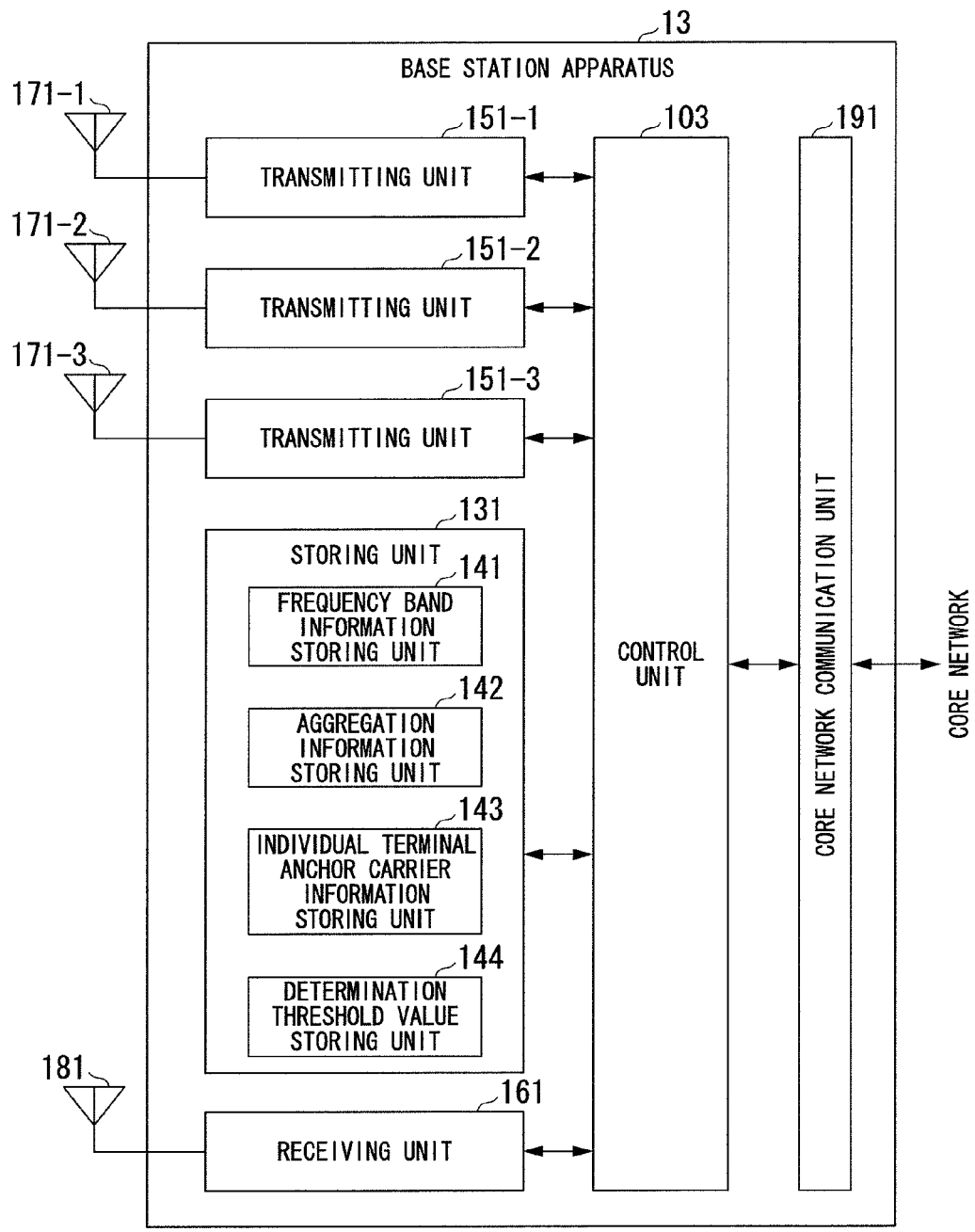
FIG. 17 is a functional block diagram showing the general constitution of a base station apparatus 13 in the third embodiment of the present invention.

FIG. 17 is a functional block diagram showing the general constitution of the base station apparatus 13.

In FIG. 17, the base station apparatus 13 includes a control unit 103, a storing unit 131, transmitting units 151-1 to 151-3 (second transmitting units), a receiving unit 161 (second receiving unit), antennas 171-1 to 171-3, an antenna 181, and a core network (CN) communication unit 191. The storing unit 131 includes a frequency band information storing unit 141, an aggregation information storing unit 142, an individual terminal anchor carrier information storing unit 143, and a determination threshold value storing unit 144.

In FIG. 17, parts that are the same as in the base station apparatus 31 of FIG. 4 are assigned the same reference numerals (131, 141 to 144, 151-1 to 151-3, 161, 171-1 to 171-3, 181, and 191) and are not described herein.

The control unit 103 separately controls the change of the anchor carrier and the change of the aggregation level. When the receiving unit 161 receives an anchor carrier change request, the control unit 103 writes the received anchor carrier into the individual terminal anchor carrier information storing unit 143. When the receiving unit 161 receives an aggregation level report, the control unit 103 writes the received aggregation level into the aggregation level information column of the aggregation level information storing unit 142.

Figure 18:
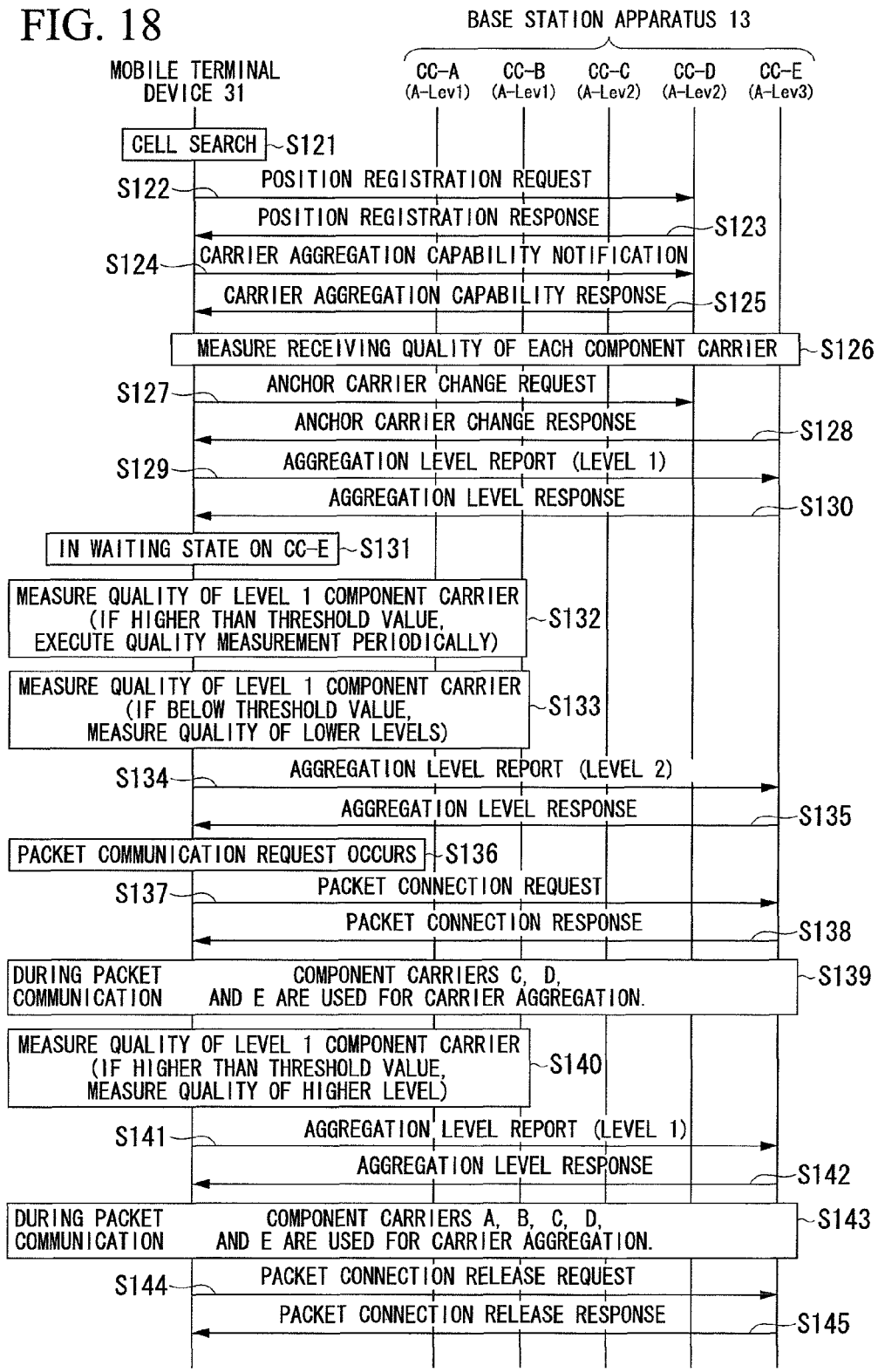
FIG. 18 is a sequence diagram showing an example of the processing protocol in the case in which the anchor carrier and the component carriers to be aggregated are separately controlled in the third embodiment of the present invention.

FIG. 18 is a sequence diagram showing the processing protocol in the case in which the anchor carrier and the component carriers to be aggregated are separately controlled.

In FIG. 18, sequences S121 to S125 are the same as sequences S101 to S105 in FIG. 14.

At sequence S126, the receiving quality measuring unit 211 measures the receiving quality on each of the component carriers A to E.

The frequency band selecting unit 212 selects the component carrier E, which has the lowest aggregation level, as the anchor carrier. The frequency band selecting unit 212 writes the component carrier identifier of the anchor carrier E into the anchor carrier information storing unit 243.

The communication control unit 313 transmits an anchor carrier change request to the base station apparatus 13 (sequence S127). In this case, the mobile terminal device 31 uses the component carrier D as the anchor carrier, and transmits an anchor carrier change request on an uplink corresponding to the component carrier D.

At sequence S128, the base station apparatus 13 that received the request from the mobile terminal device 31 writes the component carrier identifier of the anchor carrier E into the individual terminal anchor carrier information storing unit 143. The base station apparatus 13 transmits an anchor carrier change response on the requested component carrier. The mobile terminal device 31, by receiving the anchor carrier change response, verifies that the anchor carrier change has been completed.

At sequence S129, the receiving quality measuring unit 211 measures the receiving quality of each component carrier. Then, the frequency band selecting unit 212 determines the aggregation level from the measurement results. In the example of FIG. 18, the receiving quality of the component carriers A and B exceeds the threshold value F1-L read out from the determination threshold value storing unit 244. For this reason, the communication control unit 313 of the mobile terminal device 31 transmits an aggregation level report indicating the aggregation Level 1 to the base station apparatus 13, via the transmitting unit 216. This aggregation Level 1 indicates the component carrier A or B that was selected by the frequency band selecting unit 212. Therefore, the aggregation level report is a signal that indicates the component carrier selected by the frequency band selecting unit 212.

At sequence S130, the base station apparatus 13 reads out the aggregation level from the aggregation level report and writes it into the aggregation information storing unit 142. The base station apparatus 13 transmits an aggregation level response to the mobile terminal device 31. Upon receiving the aggregation level response, the mobile terminal device 31 receives the protocol control signal on the anchor carrier E. The mobile terminal device 31 uses component carriers having an aggregation level of no greater than Level 1, that is, all the component carriers, to receive user data.

At sequence S131, although the mobile terminal device 31 goes into the waiting state on the component carrier E, the receiving quality measuring unit 211 measures the aggregation level both in the waiting state and during communication. The aggregation level is measured in the same manner as in the case of the mobile terminal device 21 of the first embodiment and the mobile terminal device 26 of the second embodiment. In this case, the mobile terminal device 31 receives a call or the like from the base station apparatus on the component carrier E that serves as the anchor carrier, and stops the receiving unit 251-1 of the component carriers A and B having an aggregation level 1. Given this, the receiving quality measuring unit 211 of the mobile terminal device 31 starts the receiving unit 251-1 having an aggregation level 1 at the timing of measurement of the receiving quality, which is the target of measurement of the receiving quality, and performs the measurement (sequences S132 and S133).

By this measurement, in the case in which the frequency band selecting unit 212 determines that a change of the aggregation level is necessary, the communication control unit 313 transmits an aggregation level report once again, via the transmitting unit 261. The base station apparatus 13 reads out the aggregation level from the aggregation level report, and writes it into the aggregation information storing unit 142.

At sequence S134, because the level of the Level 1 component carrier has dropped below the threshold value, the frequency band selecting unit 212 writes Level 2 into the aggregation level storing unit 245 within the storing unit 233. The communication control unit 313 transmits an aggregation level report that indicates Level 2. The base station apparatus 13 reads out the aggregation level from the aggregation level report and writes it into the aggregation information storing unit 142.

At sequence S135, after reception of the aggregation level response, the mobile terminal device 31 performs carrier aggregation using the aggregation level stored in the aggregation level storing unit 245. In the example of FIG. 18, when a packet communication request occurs (sequence S136), communication is performed using component carriers no greater than Level 2, so that high-speed communication of user data is done (sequences S137 to S139). The receiving quality measuring unit 211 measures the receiving quality of each component carrier (sequence S140) during communication, as well. At step S141, during communication the frequency band selecting unit 212 compares the receiving quality for each component carrier with the threshold value read out from the determination threshold value storing unit 244. In this case because the receiving quality of the component carriers A and B exceeds F1-L, the frequency band selecting unit 212 determines that the aggregation level has reached Level 1. The communication control unit 213 transmits aggregation level report again. The base station apparatus 13 returns an aggregation level response to the mobile terminal device 31 (sequence S142). The base station apparatus 13 notifies the mobile terminal device 31 of the timing of adding the Level 1 component carrier into the aggregation, for example, in units of frames. The base station apparatus 13 includes information indicating the timing of adding the component carrier in the aggregation level response and then transmits the information. When a packet occurring after that frame is transmitted, the base station apparatus 13 divides the user data between the five component carriers A to E and transmits the user data. The mobile terminal device 31 receives signals on all of these component carriers, and demodulates the user data, thereby performing high-speed data communication. That is, the mobile terminal device 31, by performing carrier aggregation using the component carriers A to E, performs packet communication with the base station apparatus 13 (sequence S143).

After that, the mobile terminal device 31 transmits a packet connection release request to the base station apparatus 13 (sequence S144). In response thereto, the base station apparatus 13 transmits a packet connection release response to the mobile terminal device 31 (sequence S145).

In the third embodiment as well, similar to the case of the first embodiment, the mobile terminal device 31 transmits one component carrier identifier to the base station apparatus 13. The base station apparatus 13 then, in accordance with that component carrier identifier and the priority of selection, determines component carriers to be used in carrier aggregation. For this reason, it is possible, with a smaller amount of communication than in the case of communicating the receiving quality of all the component carriers, to determine the component carriers for performing carrier aggregation.

The component carrier having the lowest priority of selection expected to have the best receiving quality is used as the anchor carrier. By doing this, it is possible for the mobile terminal device 31 to receive control information more reliably.

Fourth Embodiment

Figure 19:
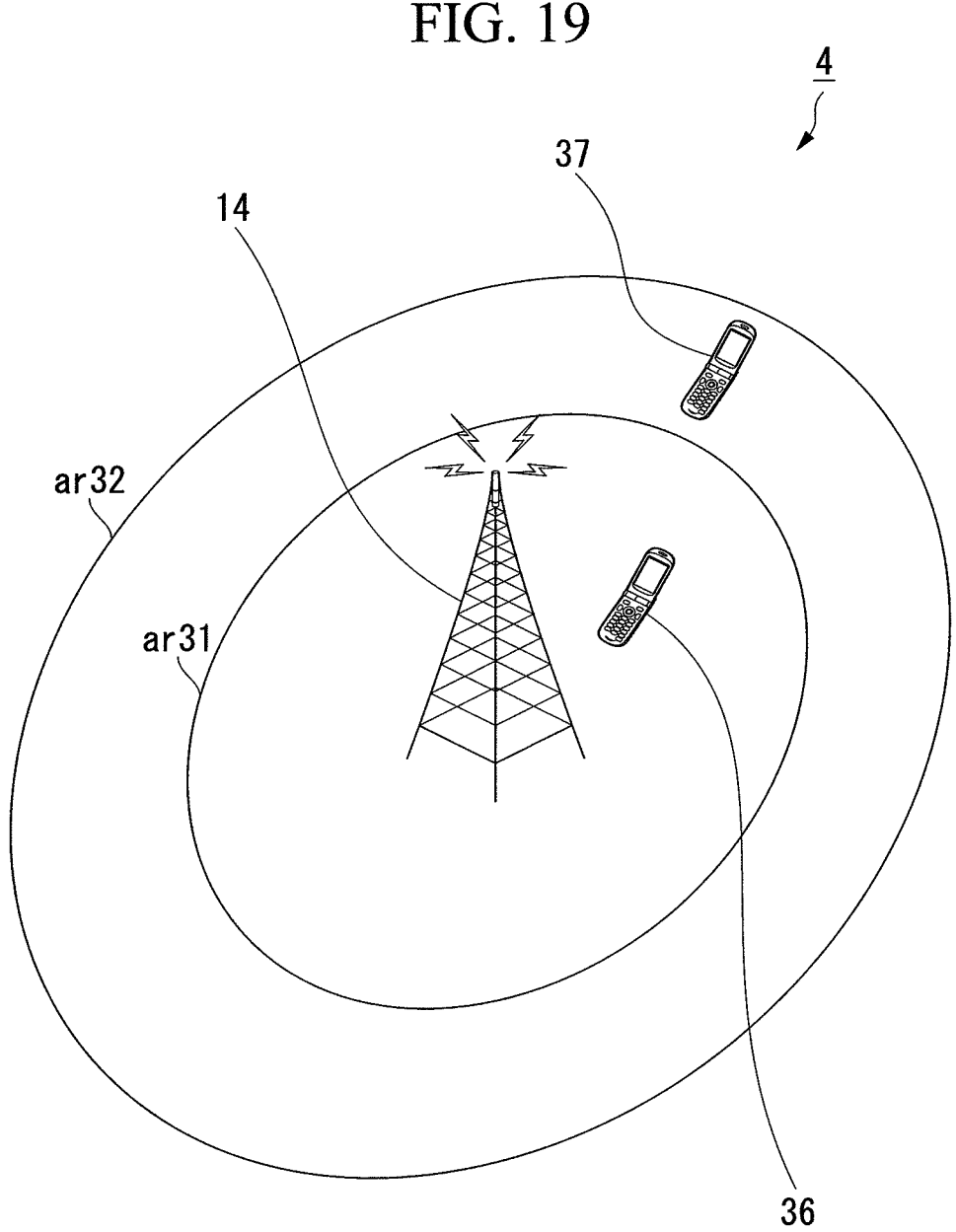
FIG. 19 is a drawing showing the constitution of a wireless communication system 4 in the case in which aggregation is not done in sequence of decreasing frequency in a fourth embodiment of the present invention.

FIG. 19 is a drawing showing the constitution of a wireless communication system 4 in the case in which the priority of selection is not in sequence of decreasing frequency.

As an example, the case in which there is a base station apparatus that communicates using the frequency band F2 in the vicinity of the base station apparatus 14 and interference with the base station apparatus is avoided will be described. If the base station apparatus 14 makes a service area of the frequency band F2 narrower than the other frequency bands due to the positional relationship with the other the base station apparatuses or the like, because better receiving quality can not be expected in the frequency band F2 than the other frequency bands, the priority of selection is made higher.

In FIG. 19, the wireless communication system 4 includes the base station apparatus 14 and the mobile terminal devices 36 and 37. Because the constitutions of the base station apparatus 14 and the mobile terminal device 36 in the fourth embodiment are the same as in FIG. 2 and FIG. 4 respectively, their illustration and description are omitted here.

The base station apparatus 14 performs downlink transmission using the three frequencies F1>F2>F3, which are the frequency bands F1 (component carriers A and B), F2 (component carriers C and D), and F3 (component carrier E). Of these, the service area ar31 of the frequency band F2 is set to be a narrower area than that of the service area ar32 of the frequency bands F1 and F3 in order for the frequency band F2 to avoid interference with other base station apparatuses. The carrier aggregation level of the frequency band F1 is set as Level 2, the carrier aggregation level of the frequency band F2 is set as Level 1, and the carrier aggregation level of the frequency band F3 is set as Level 3 by the base station apparatus 14. Specifically, the frequency band information storing unit 141 stores 1 as the priority of selection for the component carriers C and D, 2 as the priority of selection for the component carriers A and B, and 3 as the priority of selection for the component carrier E.

FIG. 20 is a sequence diagram showing an example of the control performed by the base station apparatus 14 and the mobile terminal device 36.

Sequences S161 to S164 in FIG. 20 are the same as sequences S1 to S4 in FIG. 7.

At sequence S165, the base station apparatus 14 includes the above-described aggregation combinations into a carrier aggregation capability response to be transmitted to the mobile terminal device 36. Because priority is changed, if the aggregation becomes Level 2, aggregation is performed using the component carriers A, B and E. Except for changing the carrier combination, the processing protocol is the same as described in the first and second embodiments. That is, sequences S166 to S170 in FIG. 20 are the same as sequences S127 to S130 in FIG. 18. Sequences S171 to S180 in FIG. 20 are the same as sequences S136 to S145 in FIG. 18. At sequence S174, however, the component carriers having a priority of selection no greater than 2 are A, B and E. The mobile terminal device 31 and the base station apparatus 13 perform carrier aggregation using those component carriers A, B, and E.

In the fourth embodiment, in the same manner as in the first embodiment, the mobile terminal device 36 transmits one component carrier identifier to the base station apparatus 14. The base station apparatus 14 determines the component carriers for performing carrier aggregation in accordance with this component carrier identifier and the priority of selection. For this reason, it is possible, for example, to determine the component carriers for performing carrier aggregation with a smaller amount of communication than in the case of communicating the receiving quality of all component carriers.

Carrier aggregation may also be executed in uplink transmission. Alternatively, only one frequency band may be allocated to an uplink. Alternatively, as described above, communication may be performed using an uplink corresponding to the downlink. For example, in the case in which the combination of frequencies of the uplink and the downlink is determined, communication is performed using the uplink frequency band that has been notified to the terminal using broadcast information on an anchor carrier. Carrier aggregation of signals on the uplink can be performed in the same manner as described above.

The antenna is not limited to one for each of the receiving systems, and the method for performing a MIMO communication utilizing a plurality of antennas for one component carrier may be used. In this case, a plurality of antennas are provided with the receiving unit and the receiving unit is made to accommodate MIMO reception, so that carrier aggregation can be performed in the same manner as in the case described above. The antenna may be common to each of the component carriers and the signals of the receiving antenna may be divided among and received by each of the receiving units. In this case, a distributor is provided between the receiving units using the common antenna and the antenna, the signals received from the antenna being output to a plurality of receiving units by using the distributor. In order to suppress the deterioration of the receiving quality by the distributor, a low-noise amplifier may be provided between the antenna and the distributor.

Aggregation is not restricted to five, and the aggregation level may be four, five or more, rather than three.

A part of component carriers may such that they do not accept processing such as camp-on. If there is even one component carrier having the same aggregation level, that satisfies the receiving quality and also on which it is possible to camp on, that other carrier can also be utilized for carrier aggregation. For example, in FIG. 1 assume that the component carrier C cannot perform camp-on. In the case of checking whether or not it is possible to transition to an aggregation of Level 2, the two component carriers C and D are started, and the receiving quality thereof is measured. When this is done, there is no synchronization signal or the like on the component carrier C and it is not possible to measure the receiving quality. Camping on the component carrier D, however, is possible, and the mobile terminal device can measure this receiving quality. If this receiving quality exceeds the prescribed threshold value (F2-L), the anchor carrier is changed to this frequency. If the anchor carrier is changed to this frequency, if carrier aggregation is performed, all component carriers having a Level 2 or lower aggregation level are utilized in the carrier aggregation. For this reason, because user data can be acquired on the component carrier C, it is possible to perform data communication at a high speed.

Alternatively, a program for the purpose of implementing all or part of the functions of the mobile terminal devices 21 to 23, 26, 31 to 33, 36 and 37 may be recorded on a computer-readable recording medium, and a computer system may be caused to read and execute the program recorded on the record medium, thereby performing various parts of processing. The term "computer system" used herein includes an operating system and also hardware, such as peripheral devices.

The term "computer system" also includes a webpage-providing environment (or display environment) if the WWW system is used.

The term "computer-readable recording medium" refers to a portable medium, such as a flexible disk, an optical-magnetic disc, a ROM, and a CD-ROM, and a storage device, such as a hard disk, that is built into a computer system. The term "computer-readable recording medium" includes something that dynamically retains a program for a short time, for example, a communication line when the program is transmitted via a network such as the Internet, a communication line such as a telephone line, as well as a medium to retain a program for a certain time, for example, a flash memory internally provided in a computer system acting as the server and client in that case. The program may have the object of implementing a part of the above-described function, and it may also implement the above-described function in combination with a program already stored in a computer system.

Although the embodiments of the present invention are described above with references made to the accompanying drawings, the specific constitution is not limited to the embodiments, and various designs, changes and the like are encompassed within the scope thereof, without departing from the scope of the present invention.

INDUSTRIAL APPLICABILITY

The present invention is preferable for use as a wireless communication system, a wireless communication apparatus, and a wireless communication method, for example, a mobile communication system, a base station apparatus of the mobile communication system, and a mobile terminal device of the mobile communication system.

REFERENCE SYMBOLS

1, 2, 3, 4: Wireless communication system
11, 12, 13, 14: Base station apparatus
21, 22, 23, 26, 31, 32, 33, 36, 37: Mobile terminal device
101, 103, 201, 203: Control unit
211: Receiving quality measuring unit
212: Frequency band selecting unit
213, 313: Communication control unit
214: Received data linking unit
131, 231, 233: Storing unit
141, 241: Frequency band information storing unit
142: Aggregation information storing unit
143: Individual terminal anchor carrier information storing unit
242: Usable frequency information storing unit
243: Anchor carrier information storing unit
244: Determination threshold value storing unit
245: Aggregation level storing unit
161, 251-1 to 251-3: Receiving unit
151-1 to 151-3, 261: Transmitting unit
171-1 to 171-3, 181, 271-1 to 271-3, 281: Antenna
191: Core network communication unit

The invention claimed is:

1. A wireless communication system comprising:
a first communication apparatus; and
a second communication apparatus, wherein
the first communication apparatus comprises:
a first receiving unit configured to and/or programmed to receive wireless signals by a plurality of frequency bands;
a first information storing unit configured to and/or programmed to store priorities of selection of the plurality of the frequency bands;
a second information storing unit configured to and/or programmed to store first information, the first information indicating a first frequency band, the first frequency band being included in the plurality of the frequency bands, a priority of selection of the first frequency hand being the highest among the priorities of selection of the plurality of frequency bands, receiving qualities of the plurality of the frequency bands being equal to or greater than a threshold value, the threshold value indicating the lowest receiving quality level;
a first transmitting unit configured to and/or programmed to transmit the first information stored in the second information storing unit; and
a first communication control unit configured to and/or programmed to control the first receiving unit to receive the wireless signals, the wireless signals being transmitted by the first frequency band and a second frequency band, the second frequency band having a lower priority of selection than that of the first frequency band, the second frequency band being included in the plurality of the frequency bands, and wherein
the second communication apparatus comprises:
a second receiving unit configured to and/or programmed to receive the first information transmitted by the first transmitting unit; and
a second transmitting unit configured to and/or programmed to transmit the wireless signals in parallel by the first and second frequency bands, the transmission of the wireless signals being performed based on the first information received by the second receiving unit.

2. The wireless communication system according to claim 1, wherein
the threshold value is different for each of the plurality of the frequency bands.

3. The wireless communication system according to claim 1, wherein
the better a receiving quality level is, the lower a priority is.

4. The wireless communication system according to claim 3, wherein
the lower a center frequency is, the lower a priority is.

5. The wireless communication system according to claim 3, wherein
in case that good receiving quality level cannot be expected even in case that a center frequency is low, the priority of the selection is higher than that of another frequency band having a high center frequency.

6. The wireless communication system according to claim 1, wherein
the second transmitting unit of the second communication apparatus is configured to and/or programmed to use a third frequency band having the highest priority of selection as an anchor carrier for transmitting control information for the plurality of the frequency bands together at once on the anchor carrier.

7. The wireless communication system according to claim 1, wherein
the second transmitting unit of the second communication apparatus is configured to and/or programmed to use a third frequency band having the lowest priority of selection as an anchor carrier for transmitting control information for the plurality of the frequency bands together at once on the anchor carrier.

8. The wireless communication system according to claim 1, wherein
in case that the receiving quality level of a third frequency band having the highest priority of selection is greater than the threshold value indicating good receiving quality level, the first communication control unit of the first communication apparatus is configured to and/or programmed to change a fourth frequency band having the higher priority of selection to the third frequency band.

9. The wireless communication system according to claim 1, wherein
the second transmitting unit of the second communication apparatus is configured to and/or programmed to include the priorities of selection in a notification signal and transmit the notification signal, the notification signal being common with the first communication apparatus.

10. The wireless communication system according to claim 1, wherein
same priority of selection is assigned to some of the plurality of the frequency bands.

11. A wireless communication apparatus comprising:
a receiving unit configured to and/or programmed to receive wireless signals by a plurality of frequency bands;
a first information storing unit configured to and/or programmed to store priorities of selection of the plurality of the frequency bands;
a second information storing unit configured to and/or programmed to store information, the information indicating a first frequency band, the first frequency band being included in the plurality of the frequency bands, a priority of selection of the first frequency band being the highest among the priorities of selection of the plurality of frequency bands, receiving qualities of the plurality of the frequency bands being equal to or greater than a threshold value, the threshold value indicating the lowest receiving quality level;
a transmitting unit configured to and/or programmed to transmit the information stored in the second information storing unit; and
a communication control unit configured to and/or programmed to control the receiving unit to receive the wireless signals, the wireless signals being transmitted by the first frequency band and a second frequency band, the second frequency band having a lower priority of selection than that of the first frequency band, the second frequency band being included in the plurality of the frequency bands.

12. The wireless communication apparatus according to claim 11, wherein
the receiving unit is configured to and/or programmed to receive control information on a third frequency band having the lowest priority of selection among the plurality of the frequency bands for reception.

13. A wireless communication apparatus comprising:
a receiving unit configured to and/or programmed to receive information transmitted by another wireless communication apparatus, the information indicating a first frequency band, the first frequency band being included in a plurality of the frequency bands, a priority of selection of the first frequency band being the highest among the priorities of selection of the plurality of frequency bands, receiving qualities of the plurality of the frequency bands being equal to or greater than a threshold value, the threshold value indicating the lowest receiving quality level; and
a transmitting unit configured to and/or programmed to transmit wireless signals in parallel by the first frequency band and a second frequency band, the second frequency band having a lower priority of selection than that of the first frequency band, the second frequency band being included in the plurality of the frequency bands, the transmission of the wireless signals being performed based on the information received by the receiving unit.

14. The wireless communication apparatus according to claim 13, wherein
the transmitting unit is configured to and/or programmed to transmit control information on a third frequency band having the highest priority of selection among the plurality of the frequency bands for transmission.

15. The wireless communication apparatus according to claim 13, wherein
the transmitting unit is configured to and/or programmed to transmit control information on a third frequency band having the lowest priority of selection among the plurality of the frequency bands for transmission.

16. The wireless communication apparatus according to claim 13, wherein
the transmitting unit is configured to and/or programmed to transmit the priorities of selection.

17. A wireless communication method comprising:
receiving, by a receiving unit, wireless signals by a plurality of frequency bands;
storing, by a first information storing, unit, priorities of selection of the plurality of the frequency bands;
storing, by a second information storing unit, information, the information indicating a first frequency band, the first frequency band being included in the plurality of the frequency bands, a priority of selection of the first frequency band being the highest among the priorities of selection of the plurality of frequency bands, receiving qualities of the plurality of the frequency bands being equal to or greater than a threshold value, the threshold value indicating the lowest receiving quality level;
transmitting, by a transmitting unit, the information stored in the second information storing unit; and
controlling, by a communication control unit, the receiving unit to receive the wireless signals, the wireless signals being transmitted by the first frequency band and a second frequency band, the second frequency band having a lower priority of selection than that of the first frequency band, the second frequency band being included in the plurality of the frequency bands.

18. A wireless communication method comprising:
receiving, by a receiving unit, information transmitted by another wireless communication apparatus, the information indicating a first frequency band, the first frequency band being included in a plurality of the frequency bands, a priority of selection of the first frequency band being the highest among the priorities of selection of the plurality of frequency bands, receiving qualities of the plurality of the frequency bands being equal to or greater than a threshold value, the threshold value indicating the lowest receiving quality level; and
transmitting, by a transmitting unit, wireless signals in parallel by the first frequency band and a second frequency band, the second frequency band having a lower priority of selection than that of the first frequency band, the second frequency band being included in the plurality of the frequency bands, the transmission of the wireless signals being performed based on the information received by the receiving unit.

19. The wireless communication system according to claim 1, wherein
the first transmitting unit is configured not to transmit second information to the second communication apparatus, the second information indicating the second frequency band, and
the second communication apparatus further comprises a second communication control unit configured to determine the second frequency band, the determination being performed based on the first information received by the second receiving unit, the determination being performed without receiving the second information from the first communication apparatus.

20. The wireless communication apparatus according to claim 11, wherein
the receiving unit is configured to and/or programmed to receive control information on a third frequency band having the highest priority of selection among the plurality of the frequency bands for reception.

* * * * *